United States Patent
Sun et al.

(10) Patent No.: US 12,536,792 B2
(45) Date of Patent: Jan. 27, 2026

(54) SYSTEMS AND METHODS FOR AUTOMATED TRACKING ON A HANDHELD DEVICE USING A REMOTE CAMERA

(71) Applicant: Adeia Guides Inc., San Jose, CA (US)

(72) Inventors: Jing Sun, King of Prussia, PA (US); Yubin Cui, Chesterbrook, PA (US); Wei Dai, West Chester, PA (US); Yunbo Tang, Malvern, PA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 17/254,060

(22) PCT Filed: Dec. 18, 2018

(86) PCT No.: PCT/US2018/066250
§ 371 (c)(1),
(2) Date: Dec. 18, 2020

(87) PCT Pub. No.: WO2020/131037
PCT Pub. Date: Jun. 25, 2020

(65) Prior Publication Data
US 2021/0303853 A1    Sep. 30, 2021

(51) Int. Cl.
*G06V 20/00* (2022.01)
*G06V 10/75* (2022.01)
(Continued)

(52) U.S. Cl.
CPC .............. *G06V 20/00* (2022.01); *G06V 10/75* (2022.01); *G06V 20/10* (2022.01); *G06V 20/20* (2022.01);
(Continued)

(58) Field of Classification Search
CPC ...... G06V 10/75; G06V 10/751; G06V 20/00; G06V 20/10; G06V 20/13; G06V 20/20;
(Continued)

(56) References Cited

U.S. PATENT DOCUMENTS 7,761,892 B2    7/2010  Ellis et al.
10,176,379 B1 *  1/2019  Barton ................. G06V 40/172
(Continued)

FOREIGN PATENT DOCUMENTS

EP    2768214 A2    8/2014
WO    2009111498 A2    9/2009

OTHER PUBLICATIONS

U.S. Appl. No. 17/254,042, filed Dec. 18, 2020, Jing Sun.
(Continued)

*Primary Examiner* — Peter D Le
(74) *Attorney, Agent, or Firm* — HALEY GUILIANO LLP

(57) ABSTRACT

Systems and methods are disclosed for determining which of the multitude of objects within a feed being received from a remote camera to track. Specifically, objects within an image feed received from a remote camera are detected and compared with objects in visual content items captured by the user's device (e.g., pictures/videos captured by the smart phone or the electronic tablet). If a match is found between an object within the feed of the video (e.g., a person) and an object within visual content items captured on the user's device (e.g., the same person), the system will proceed to track the identified object.

20 Claims, 14 Drawing Sheets

(51) Int. Cl.
  *G06V 20/10* (2022.01)
  *G06V 20/20* (2022.01)
  *G06V 20/40* (2022.01)
  *G06V 40/16* (2022.01)
  *H04N 23/66* (2023.01)
  *H04N 23/69* (2023.01)

(52) U.S. Cl.
  CPC ............ *G06V 20/40* (2022.01); *G06V 40/161* (2022.01); *H04N 23/66* (2023.01); *H04N 23/69* (2023.01)

(58) Field of Classification Search
  CPC .. G06V 20/40; G06V 40/161; H04N 5/23203; H04N 5/23296
  See application file for complete search history.

(56) References Cited

U.S. PATENT DOCUMENTS

| | | | |
|---|---|---|---|
| 10,706,699 B1* | 7/2020 | Kerzner | G06T 7/521 |
| 10,740,618 B1* | 8/2020 | Karlsson | H04N 21/23439 |
| 10,757,319 B1* | 8/2020 | Luo | H04N 5/272 |
| 11,048,919 B1* | 6/2021 | Modolo | G06V 20/40 |
| 2006/0025083 A1* | 2/2006 | Lee | H04M 11/007 |
| | | | 455/566 |
| 2007/0022447 A1* | 1/2007 | Arseneau | H04H 60/15 |
| | | | 725/38 |
| 2007/0052801 A1* | 3/2007 | Shimamura | G08B 13/19658 |
| | | | 348/E5.042 |
| 2007/0268369 A1* | 11/2007 | Amano | H04N 7/18 |
| | | | 348/E7.086 |
| 2007/0279494 A1* | 12/2007 | Aman | H04N 5/278 |
| | | | 348/169 |
| 2008/0129825 A1* | 6/2008 | DeAngelis | H04N 7/181 |
| | | | 348/E7.086 |
| 2008/0169929 A1* | 7/2008 | Albertson | G08B 13/19602 |
| | | | 340/573.1 |
| 2009/0059007 A1* | 3/2009 | Wagg | G11B 27/105 |
| | | | 348/157 |
| 2009/0245573 A1 | 10/2009 | Saptharishi et al. | |
| 2009/0256925 A1* | 10/2009 | Yoshizumi | H04N 5/23219 |
| | | | 348/222.1 |
| 2010/0021009 A1* | 1/2010 | Yao | G06V 20/54 |
| | | | 382/103 |
| 2010/0149335 A1* | 6/2010 | Miller, II | G08B 13/19602 |
| | | | 348/148 |
| 2010/0232643 A1* | 9/2010 | Chen | G06T 7/248 |
| | | | 382/103 |
| 2011/0081052 A1* | 4/2011 | Bigioi | G06V 10/44 |
| | | | 382/118 |
| 2012/0140015 A1* | 6/2012 | DeGrazia | H04N 7/147 |
| | | | 348/E7.078 |
| 2012/0290591 A1* | 11/2012 | Flynn | G06F 16/5866 |
| | | | 707/754 |
| 2012/0314916 A1* | 12/2012 | Rothschild | G06V 20/30 |
| | | | 382/118 |
| 2013/0169853 A1 | 7/2013 | Luong | |
| 2013/0195316 A1* | 8/2013 | Bataller | G06T 7/246 |
| | | | 382/103 |
| 2013/0250050 A1* | 9/2013 | Kanaujia | H04N 13/106 |
| | | | 348/42 |
| 2014/0063174 A1* | 3/2014 | Junuzovic | G06Q 10/101 |
| | | | 348/E7.083 |
| 2014/0063237 A1 | 3/2014 | Stone et al. | |
| 2014/0218371 A1* | 8/2014 | Du | G06T 13/40 |
| | | | 345/473 |
| 2014/0225924 A1* | 8/2014 | Loxam | G09G 5/14 |
| | | | 345/633 |
| 2014/0226855 A1* | 8/2014 | Savvides | H04W 4/021 |
| | | | 382/103 |
| 2014/0253743 A1* | 9/2014 | Loxam | G06T 11/60 |
| | | | 348/207.1 |
| 2014/0270348 A1* | 9/2014 | Wagner | G06T 7/74 |
| | | | 382/103 |
| 2015/0007238 A1* | 1/2015 | Crouch | H04N 21/21805 |
| | | | 348/148 |
| 2015/0029347 A1* | 1/2015 | Tsubusaki | H04N 23/64 |
| | | | 348/208.1 |
| 2015/0084951 A1* | 3/2015 | Boivin | H04N 5/2621 |
| | | | 345/419 |
| 2016/0063235 A1* | 3/2016 | Tussy | G06Q 20/3276 |
| | | | 726/6 |
| 2016/0098612 A1 | 4/2016 | Viviani | |
| 2016/0335484 A1* | 11/2016 | Xie | H04W 4/023 |
| 2016/0350587 A1* | 12/2016 | Bataller | G06T 7/292 |
| 2017/0028308 A1* | 2/2017 | Bear | H04N 5/23203 |
| 2017/0177925 A1* | 6/2017 | Volkart | G06V 20/52 |
| 2017/0187946 A1* | 6/2017 | Kozakura | H04N 1/00307 |
| 2017/0255880 A1* | 9/2017 | Daher | H04N 7/183 |
| 2017/0256288 A1* | 9/2017 | Ai | H04N 5/2628 |
| 2017/0308909 A1* | 10/2017 | Faith | G06Q 50/01 |
| 2017/0316582 A1* | 11/2017 | Chen | H04N 5/247 |
| 2017/0365102 A1* | 12/2017 | Huston | G06T 15/205 |
| 2018/0035136 A1* | 2/2018 | Crowe | H04N 21/4316 |
| 2018/0040133 A1 | 2/2018 | Srinivasan et al. | |
| 2018/0077345 A1* | 3/2018 | Yee | H04N 5/23206 |
| 2018/0082430 A1* | 3/2018 | Sharma | G06T 7/246 |
| 2018/0091704 A1* | 3/2018 | Koyama | H04N 13/243 |
| 2018/0131869 A1 | 5/2018 | Kim et al. | |
| 2018/0137632 A1* | 5/2018 | Takada | G06T 13/00 |
| 2018/0157939 A1* | 6/2018 | Butt | G06N 20/00 |
| 2018/0173963 A1* | 6/2018 | Taylor | G06T 3/00 |
| 2018/0301169 A1* | 10/2018 | Ricciardi | G11B 27/036 |
| 2018/0343442 A1* | 11/2018 | Yoshikawa | H04N 21/438 |
| 2018/0349736 A1* | 12/2018 | Bapat | G06V 20/53 |
| 2019/0065895 A1 | 2/2019 | Wang et al. | |
| 2019/0110047 A1* | 4/2019 | De Muynck | H04N 19/119 |
| 2019/0149740 A1* | 5/2019 | Cheng | H04N 5/23299 |
| | | | 382/103 |
| 2019/0156121 A1* | 5/2019 | Kucharski | B64C 39/024 |
| 2019/0199907 A1* | 6/2019 | Daulton | H04N 5/23299 |
| 2019/0303670 A1* | 10/2019 | Bryden | G06V 20/20 |
| 2019/0313131 A1* | 10/2019 | Ring | H04N 21/6181 |
| 2019/0370553 A1* | 12/2019 | Duan | G06V 20/52 |
| 2020/0125838 A1* | 4/2020 | Dalley, Jr. | H04N 5/247 |
| 2020/0143593 A1* | 5/2020 | Rudman | G06T 19/006 |
| 2020/0160538 A1* | 5/2020 | Daniel | G06T 7/248 |
| 2020/0204871 A1* | 6/2020 | Bai | H04N 21/4223 |
| 2020/0349344 A1* | 11/2020 | Gefen | G06V 40/172 |
| 2020/0351543 A1* | 11/2020 | Kerofsky | H04N 21/4312 |
| 2021/0303830 A1 | 9/2021 | Sun et al. | |
| 2022/0300753 A1* | 9/2022 | Bapat | H04N 7/18 |

OTHER PUBLICATIONS

International Search Report and Written Opinion of PCT/US2018/066231 dated Feb. 18, 2019.
International Search Report and Written Opinion of PCT/US2018/066250 dated Sep. 2, 2019.

* cited by examiner

SYSTEMS AND METHODS FOR AUTOMATED TRACKING ON A HANDHELD DEVICE USING A REMOTE CAMERA

CROSS-REFERENCE TO RELATED APPLICATION

This application is a United States National Phase Application filed under 35 U.S.C. § 371 of International Patent Application No. PCT/US2018/066250, filed on Dec. 18, 2018 which is hereby incorporated by reference in its entirety.

BACKGROUND

The present disclosure is directed to tracking objects that are detected within a field of view of a camera. Furthermore, the present disclosure describes various tracking mechanisms aimed at tracking objects when multiple objects appear within a frame of one or more remote cameras.

SUMMARY

When people view live video on a personal device (e.g., a smart phone or electronic tablet) whether that video is being received from a built-in camera or from a remote camera, there is often an object within the video that the person viewing the video wants to track/focus on. However, there is usually a multitude of objects in each frame of the video for the processing device to select for tracking. At best, currently-available systems use known techniques to identify that each frame has multiple objects. However, these systems lack a way to determine which of the multitude of objects to track. If the device selects the wrong object or all the objects for tracking some objects may be out of focus (e.g., due to depth of field change) and lead to degraded image quality. This will degrade the operator's experience in viewing the content. Thus, systems and methods are disclosed herein to solve this problem. Specifically, objects within a frame of a camera are detected and compared with objects in visual content items captured by the user's device (e.g., pictures/videos captured by the smart phone or the electronic tablet). If a match is found between an object within the frame of the video (e.g., a person) and an object within visual content items captured on the user's device (e.g., the same person), the system will proceed to track the identified object.

In some aspects, a device with a built-in camera (e.g., a smartphone, electronic tablet, or another suitable device) is used to capture visual content items (e.g., photos, videos, or other suitable content items). Those items are stored on the capturing device for later viewing. When a camera application of the device is initiated, that application will initialize the camera of the device. The camera captures what is being visible through the lens and stores that information in memory (e.g., by storing one or more frames). It should be noted that the systems and methods disclosed herein may be executed by a camera application on a device (e.g., as a plug-in or another suitable component). Alternatively, a stand-alone tracking application that interfaces with the camera's software and/or hardware can be created. For clarity, these systems and methods described herein will be collectively referred to as a tracking application.

The tracking application accesses images that are being generated by the camera and identifies different objects within each image or frame. Each identified object within the frame or image is compared with objects within visual content items captured by the camera of the device. The tracking application may identify what those objects represent. Those objects may represent people, pets, cars, and other suitable entities. For example, the device that has a camera may be taken to a swim meet (e.g., a user may be watching the user's child swim at a swim meet). As the camera of the device is capturing data that is coming in from the camera's lens (e.g., different kids in the pool), that data may be analyzed by the tracking application. Because the user is interested in capturing videos of the user's own child, the tracking application, in order to track the right child, may compare the objects in the lens (e.g., objects representing different kids in the pool) with objects in visual content items captured by the user's device. When the tracking application iterates through objects representing different kids in the pool and compares those objects with objects captured by the device (e.g., including object(s) representing the user's child), the tracking application will find a match and proceed to track that object.

In some instances, multiple object within a frame will match objects within the visual content items captured by the device. For example, a parent that wants to record his or her child at a swimming meet may have pictures of other kids on the device (e.g., friends' children). Thus, multiple objects within a frame may match objects within visual content items that were captured by the device. The tracking application, in order to identify the correct object to track, determines a number of visual content items that each object appears in and makes a determination as to which object to track. For example, if a user's child appears in one hundred pictures and/or videos, but another child (e.g., a friend's child) appears in ten pictures and/or videos, the tracking application will identify the user's child as the one to track.

The tracking application may process objects representing persons in a way that is different from processing other objects (e.g., animals or cars). The tracking application may determine that one or more persons are in the frame (e.g., by using edge detection techniques combined with face identification techniques). When the tracking application detects that there is one or more persons in the frame, the tracking application may generate a set of objects corresponding to the persons. For example, the tracking application may identify the faces of any persons detected and store those faces. At a later time, those faces may be used for face comparison against objects within visual content items captured by the device. The tracking application will compare the faces of the identified persons with faces within the visual content items that were captured by the devices prior to comparing any other objects. This may be useful to speed up processing.

Another way to speed up processing of the objects is for the tracking application to generate signatures for objects within visual content items as well as objects within the frame in order to identify which object to track. If signatures are pre-generated, the tracking application will not have to perform operations to identify objects both within visual content items and within the frame on the fly. Instead, the system will be able to compare signatures of the already detected objects. To generate the signatures, the tracking application may retrieve each visual content item and identify each object within the visual content item. The identified objects may be stored, and a unique signature may be generated for each object. For example, the tracking application may store specific pixels that are associated with each object and extract signature information from the pixels (e.g., color, relative location of pixel colors, and other suitable signature information). The tracking application may store each signature (e.g., in a local database for quick access). The tracking application may, at certain intervals, scan the device for newly-captured visual content items and process those items in order to keep the database up to date with signatures for objects in new visual content items.

The tracking application may store, with each signature, a number of visual content items the object corresponding to the signature appears in. As the tracking application scans the visual content items captured by the user's device for objects for signature creation, any objects that have been encountered before may have a counter that is incremented upon each encounter. The number of visual content items that each object appears in may be used to identify which object to track when there is more than one matching object within the frame of the camera.

Some objects that are identified within the visual content items captured by the device may be associated with specific keywords that identify those objects. For example, a picture of the user's child may be associated with the child's name (e.g., Brian). In instances when the tracking application identifies various objects within the frame, the tracking application may receive input (e.g., via a microphone) identifying the object to track. For example, the tracking application may receive a command, "Track Brian." Upon receipt of a command, the tracking application may compare keywords of each object in the frame that matches an object within the visual content items captured by the device with the received keyword (e.g., Brian) and determine that the object corresponding to the keyword is to be tracked.

In some aspects, a handheld device interfaces with a remote camera in order to track an object. The camera will transmit images to the handheld device. The handheld device receives each image and processes the images to identify objects within each image received. The identified objects may be compared with each object in each visual content item captured by the camera of the handheld device. This comparison may be performed in a way similar to comparing objects detected within a frame with objects within visual content items captured by the device, as discussed above. The tracking application may determine, based on the comparison, which object in the image matches objects in visual content items captured by the handheld device and start tracking the matching object.

When tracking objects, the tracking application may perform a zoom-in operation on the object within each image of the video feed. This feature will enable a user to have a better view of the object that the user is focused on. The zoom-in operation may be a software operation within the software of the handheld device or a command to the remote camera to perform software or optical zoom. If the object being tracked is no longer in the images being received from the remote camera, the tracking application on the handheld device transmits, to the remote camera, a command to perform a zoom-out operation. The tracking application may continue transmitting zoom-out commands until the object is detected within the images being received or until maximum zoom-out of the camera has been achieved. For example, if a child is swimming from one end of the pool to the other, the child may swim out of the camera's field of view. In this case, the tracking application may instruct the remote camera to zoom out. In some embodiments, the tracking application may instruct the camera to rotate in a specific direction to reacquire the child, if the remote camera has that capability.

It should be noted that the systems, methods, apparatuses, and/or aspects described above may be applied to, or used in accordance with, other systems, methods, apparatuses, and/or aspects described in this disclosure.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
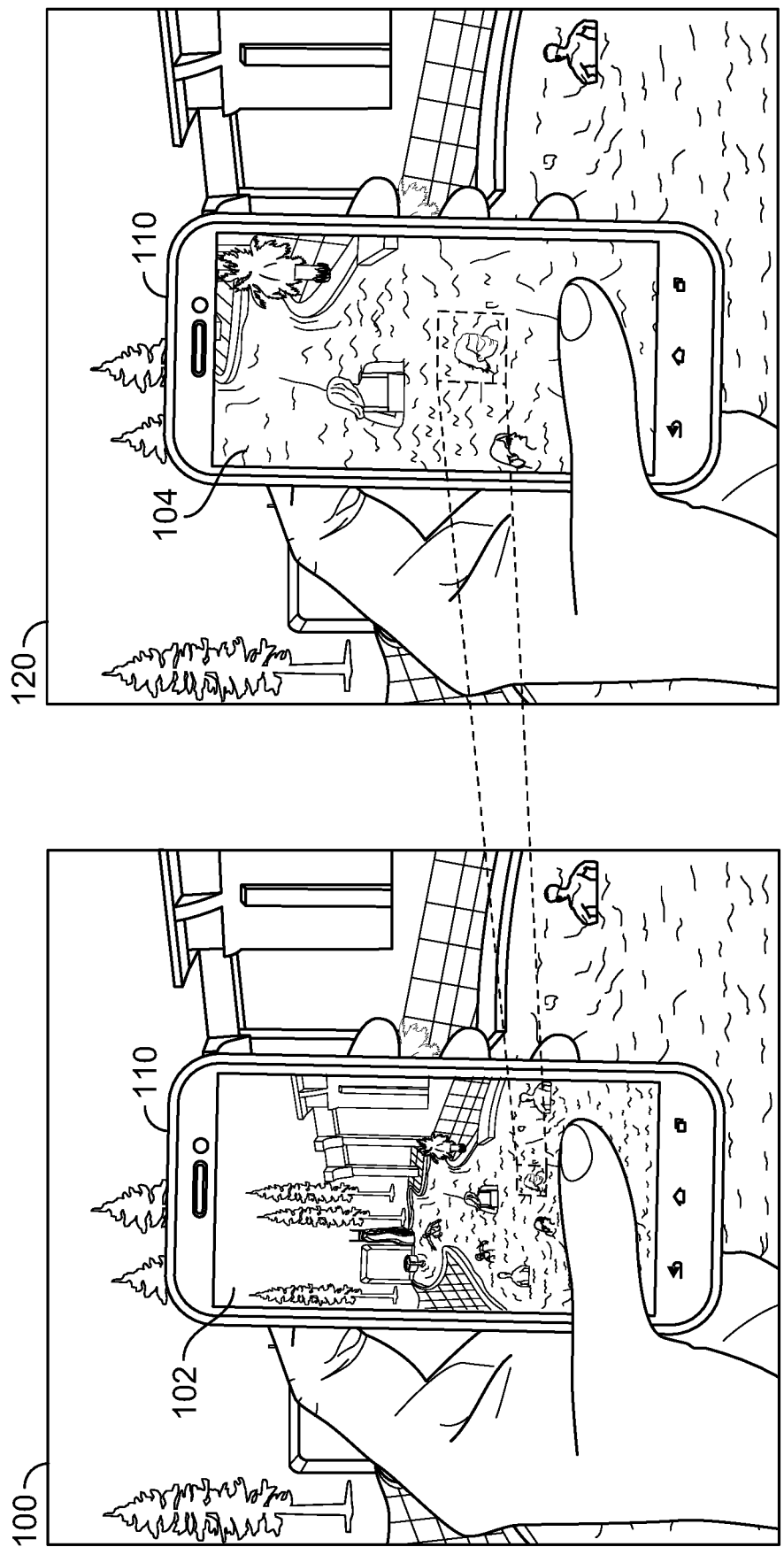
FIG. 1 shows an illustrative view change when an object within a frame of a camera has been identified for tracking, in accordance with some embodiments of the disclosure.

Systems and methods are disclosed herein for identifying an object to track. FIG. 1 shows an illustrative view change when an object within a frame of a camera has been identified for tracking. Illustration 100 shows a smart phone 110 with an image frame 102 showing a number of people swimming in a swimming pool. The tracking application residing on smart phone 110 is able to identify a plurality of objects within the image. Several methods for identifying objects within an image may be used. For example, a deep learning technique can be used to learn inherent features of any object in order to identify that object. A model can be created that is trained to identify objects based on their features. A large number of training images can be inputted into a model to identify features of any given object in order to detect the object in the image. Alternatively, a pretrained deep learning model can be fine-tuned for this task. A machine learning technique can also be used to identify objects within an image. For example, manual feature extraction can be performed by starting out with a collection of images for each object and a set of relevant features. The extracted features can be separated into distinct categories and used when analyzing and classifying new objects.

The tracking application also applies the same algorithms to visual content items captured by the device on which the tracking application resides to identify objects within those visual content items. It should be noted that the tracking application can pre-classify the objects within the visual content items of the device in order to be able to do quicker comparisons. It may take, depending on the number of visual content items on the device, a large amount of process power and/or time to do the classification/identification on the fly. Each object can be classified as, for example, dog, cat, person, tree, building, or another suitable object. The tracking application compares each object detected in the image with objects in the visual content items captured by the camera of the device. If the tracking application finds a match (e.g., a person is detected in the frame), the tracking application executes a comparison algorithm on the images of the objects to determine whether it is the same object (e.g., the same person, the same dog, or the same cat).

Examples of visual content items include electronically consumable media content that includes a video component. Examples of the items may include video clips, still images, images that include multiple frames. Visual content items may also include holographic images, holographic presentations, 3-D images and 3-D videos.

Another way to identify/detect whether an object in the image/frame is the same object in a visual content item captured by the device is to use an algorithm to identify the border of the object and store the pixels of those objects. One of the algorithms that can be used for the identification is edge detection. The edge detection algorithm can identify the pixels of each object in the frame and store those pixels. The same algorithm can be executed against each visual content item captured by the device in order to store pixels of those objects. The stored pixels representing each object in the frame of the camera may be compared with pixels representing each object in visual content items captured by the device in order to find matching objects.

If the tracking application finds a match, the tracking application will track the identified object. For example, illustration 120 shows the same smart phone 110 and image 104. Image 104 differs from image 102 in that one of the objects in image 104 is being tracked by the tracking application. Specifically, the tracking application has zoomed in on the object. This feature enables a better operator experience in that the operator is able to take a photo or a video in a way that highlights to the operator the object that the operator desires to record (e.g., by taking a photo or a video).

Figure 2:
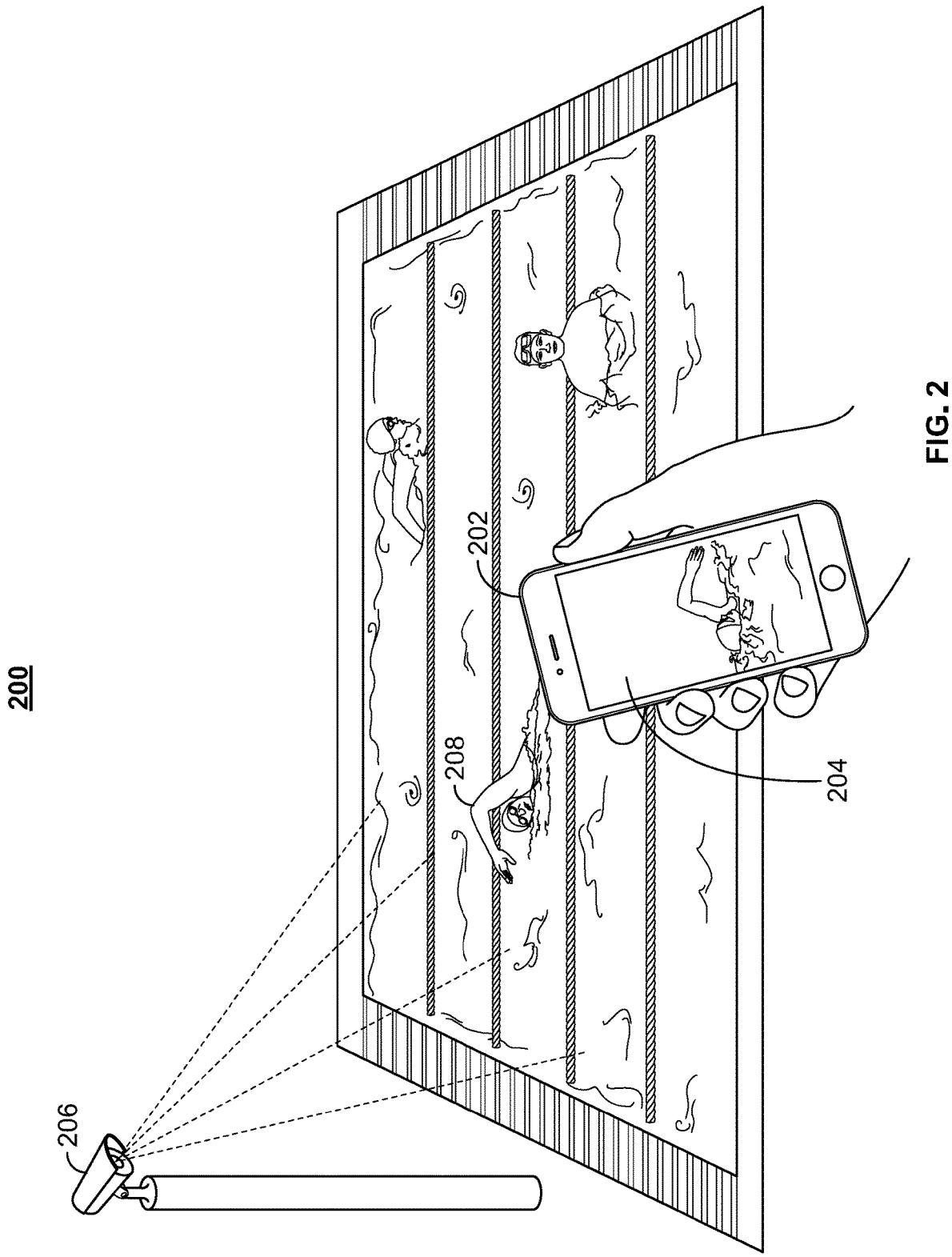
FIG. 2 shows an illustrative view of an object in a video feed from a remote camera, in accordance with some embodiments of the disclosure.

FIG. 2 shows an illustrative view of an object in a video feed from a remote camera. In FIG. 2, smart phone 202 is receiving images from a remote camera 206. The remote camera may be mounted in a location that enables the remote camera to capture images of as many objects or people in a location. Smart phone 202 may be receiving images from remote camera 206 and executing a tracking algorithm (e.g., using the tracking application) in order to track swimmer 208. In this embodiment, each image received from the camera is analyzed by the tracking application in order to track the correct object (i.e., swimmer 208).

Figure 3:
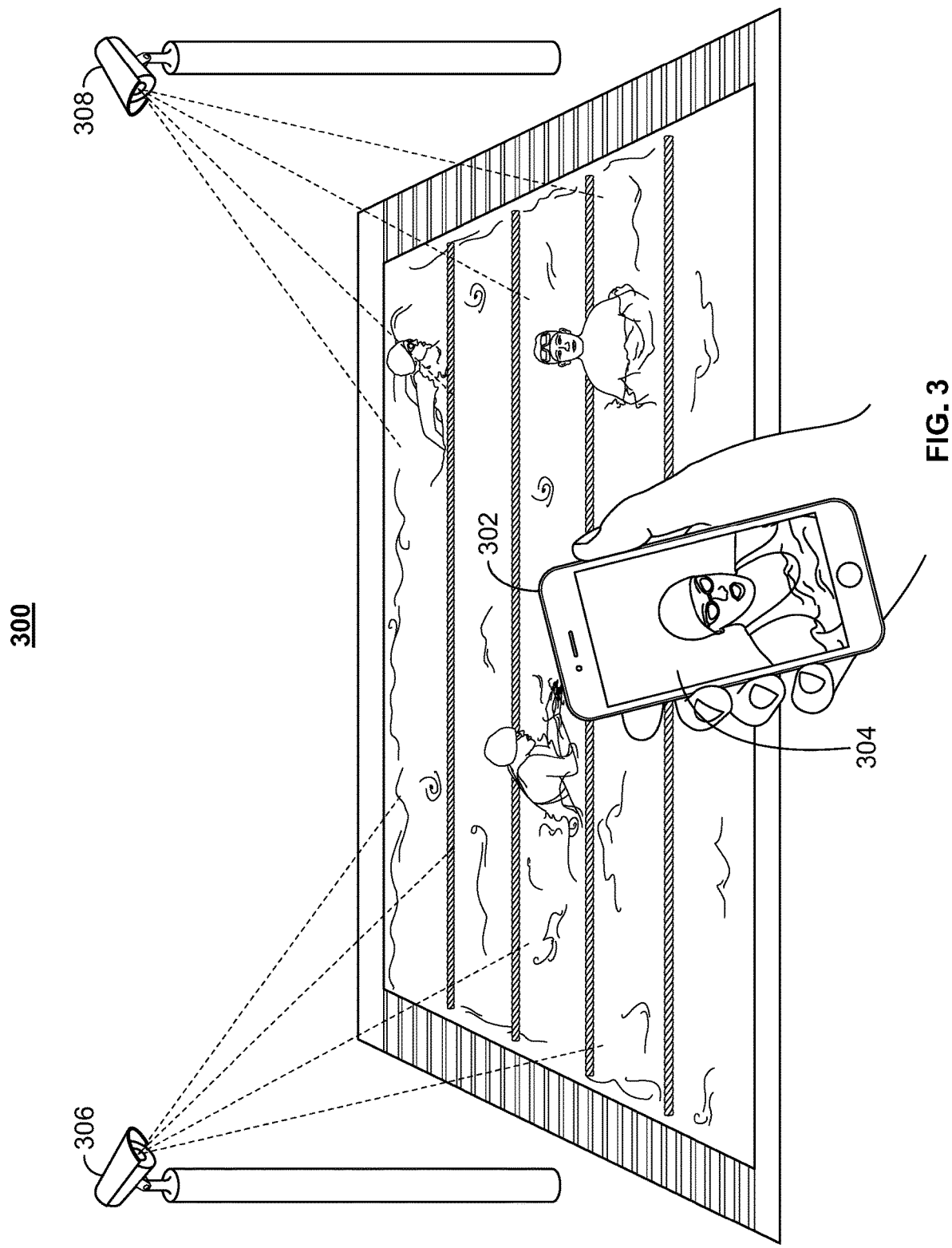
FIG. 3 shows an illustrative view of an object in a video feed from multiple remote cameras, in accordance with some embodiments of the disclosure.

FIG. 3 shows an illustrative view of an object in a video feed from multiple remote cameras. Remote cameras 306 and 308 may be mounted in a location for an optimum view of objects. Smart phone 302 may be receiving images from both cameras and determining from which camera it is receiving images that include the tracked swimmer. Image 304 shows the tracked swimmer as tracked between the two cameras. In embodiments where multiple cameras are detected, the tracking application analyzes images from both cameras to determine which object to track and presenting the proper feed to the operator. In certain instances, it is possible that the tracking application receives images from both cameras that include objects that are found in the visual content items captured by the user. In this instance, the tracking application tracks the object that appears in more visual content items captured by the devices than the other detected object.

Figure 4:
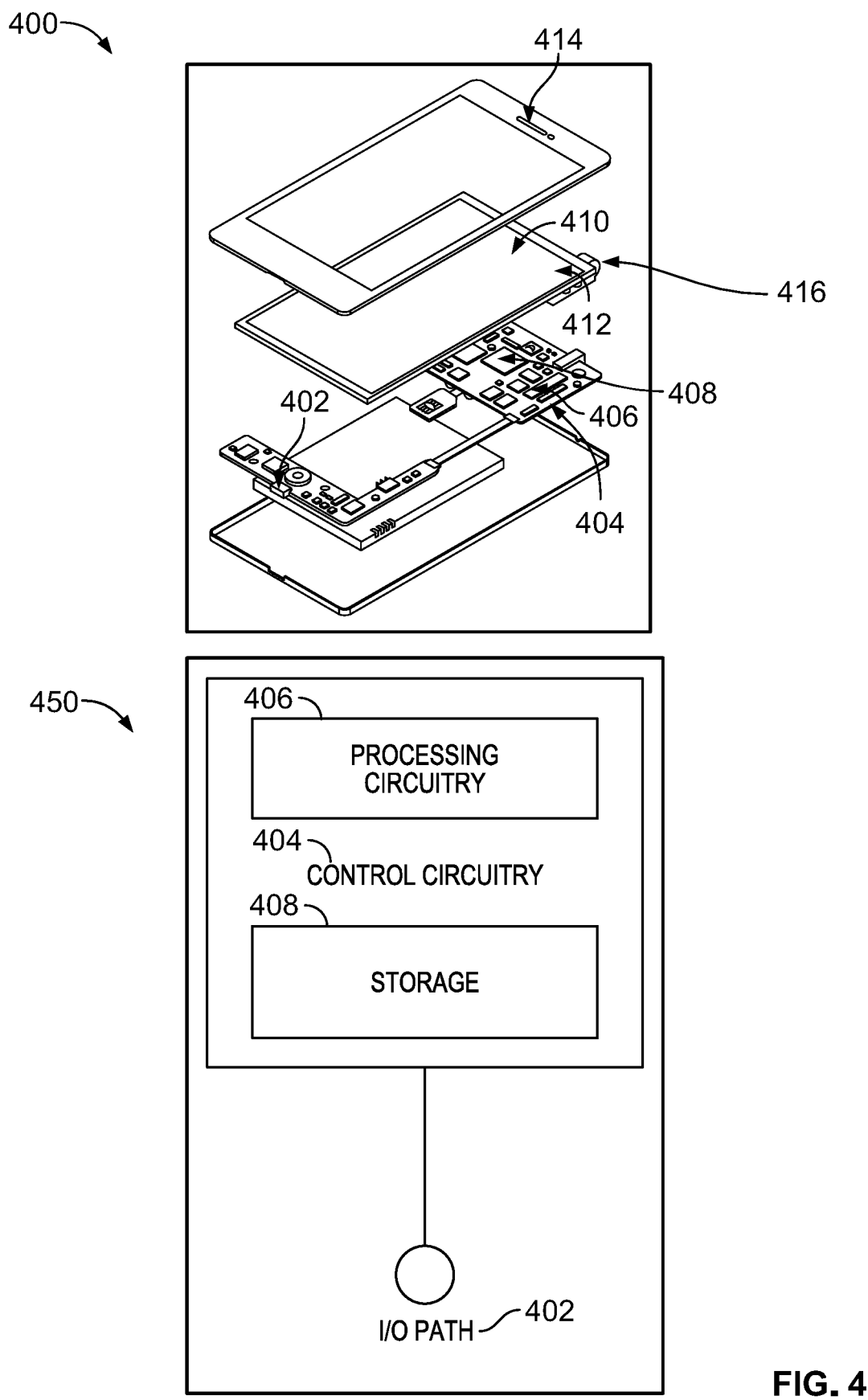
FIG. 4 is a diagram of two illustrative computing devices, in accordance with some embodiments of the disclosure.

FIG. 4 is a diagram of two illustrative computing devices, in accordance with some embodiments of this disclosure. As depicted, media device 400 may be a smartphone or an electronic tablet, whereas media device 450 may be a server. Devices 400 and 450 may receive content and data via input/output (hereinafter "I/O") path 402. I/O path 402 on device 400 may provide visual data (e.g., images that are being sent from device 450) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths but are shown as a single path in FIG. 4 to avoid overcomplicating the drawing. On device 450 I/O path 402 may be used to transmit data (e.g., image data) to device 400 and also receive commands from other devices (e.g., device 400).

Control circuitry 404, whether on device 400 or device 450 may be based on any suitable processing circuitry, such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a notification delivery application stored in memory (i.e., storage 408). Specifically, control circuitry 404 may be instructed by the notification delivery application to perform the functions discussed above and below.

In client/server-based embodiments, control circuitry 404 may include communications circuitry suitable for communicating with a notification delivery application server or other networks or servers. The instructions for carrying out the above-mentioned functionality may be stored on a server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths. In addition, communications circuitry may include circuitry that enables peer-to-peer communication of media devices, or communication of media devices in locations remote from each other.

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, hard drives, optical drives, solid state devices, quantum storage devices, gaming consoles, gaming media, or any other suitable fixed or removable storage devices, and/or any combination of the same. Non-volatile memory may also be used (e.g., to launch a boot-up routine and other instructions). Cloud-based storage may be used to supplement storage 408 or instead of storage 408.

Control circuitry 404 may include audio-generating circuitry, one or more MP3 decoders or other digital decoding circuitry, or any other suitable video or audio circuits or combinations of such circuits. Encoding circuitry (e.g., for converting digital signals to audio and video signals for storage and presentation) may also be provided. Control circuitry 404 may also include scaler circuitry for upconverting and downconverting content into the preferred output format of the device 400. Circuitry 404 may also include digital-to-analog converter circuitry and analog-to-digital converter circuitry for converting between digital and analog signals. The encoding circuitry may be used by the media device to receive and to display, to play, or to record/store content. The circuitry described herein, including, for example, the encoding, decoding, encrypting, decrypting, scaler, and analog/digital circuitry, may be implemented using software running on one or more general purpose or specialized processors. If storage 408 is provided as a separate device from device 400, the encoding circuitry may be associated with storage 408.

A user may send instructions to control circuitry 404 using user input interface 410 of media device 400. User input interface 410 and user input interface 420 may be any suitable user interface, such as a remote control, mouse, trackball, keypad, keyboard, touch screen, touchpad, stylus input, joystick, voice recognition interface, or other user input interfaces. Display 410 may be a touchscreen or touch-sensitive display. In such circumstances, user input interface 410 may be integrated with or combined with display 412. Speakers 414 and camera 416 may be provided as integrated with other elements of media device 400. Device 450 may also have control circuitry 404 that includes processing circuitry 406, storage 408, and I/O path 402. These components can function in the same manner as described in relation to device 400.

Figure 5:
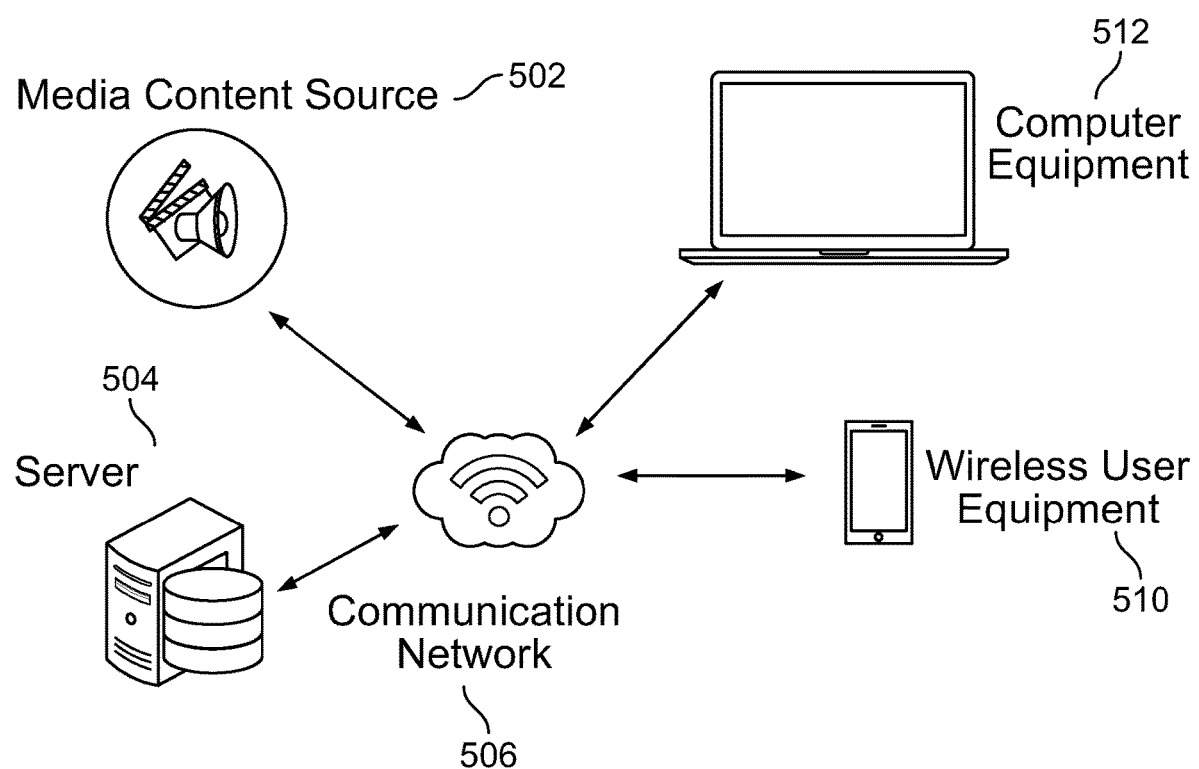
FIG. 5 is a diagram of an illustrative media system, in accordance with some embodiments of the disclosure.

Devices 400 and 450 can be part of system 500 of FIG. 5. Device 400 may be computer equipment 512, wireless equipment 510, or any other type of user equipment suitable for accessing content, such as a non-portable gaming machine. For simplicity, these devices may be referred to herein collectively as client devices and may be substantially similar to devices described above. Device 450 may be represented by server 504. In system 500, there is typically more than one of each type of client device but only one of each is shown in FIG. 5 to avoid overcomplicating the drawing. In addition, each user may utilize more than one type of client device and also more than one of each type of client device.

The user equipment devices may be coupled to communications network 506. Communications network 506 may be one or more networks including the Internet, a mobile phone network, mobile voice or data network (e.g., a 4G or LTE network), cable network, public switched telephone network, or other types of communications network or combinations of communications networks. Paths (e.g., depicted as arrows connecting the respective devices to communications network 506) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths, but are shown as a single path in FIG. 5 to avoid overcomplicating the drawing.

Although communications paths are not drawn between user equipment devices, these devices may communicate directly with each other via communications paths as well as other short-range point-to-point communications paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, Inc. The user equipment devices may also communicate with each other directly through an indirect path via communications network 506.

System 500 includes media content source 502 and processing server 504. Communications with the media content source 502 and processing server 504 may be exchanged over one or more communications paths, but are shown as a single path in FIG. 5 to avoid overcomplicating the drawing. In addition, there may be more than one of each of media content source 502 and processing server 504, but only one of each is shown in FIG. 5 to avoid overcomplicating the drawing. If desired, media content source 502 and processing server 504 may be integrated as one source device.

Processing server 504 may retrieve guidance data from media content source 502, process the data as will be described in detail below, and forward the data to the client devices 510 and 512. Media content source 502 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Media content source 502 may be the originator of content (e.g., a television broadcaster, a Webcast provider, etc.) or may not be the originator of content (e.g., an on-demand content provider, an Internet provider of content of broadcast programs for downloading, etc.). Media content source 502 may include cable sources, satellite providers, on-demand providers, Internet providers, over-the-top content providers, or other providers of content. Media content source 502 may also include a remote media server used to store different types of content (including video content selected by a user), in a location remote from any of the client devices. Systems and methods for remote storage of content and providing remotely stored content to user equipment are discussed in greater detail in connection with Ellis et al., U.S. Pat. No. 7,761,892, issued Jul. 20, 2010, which is hereby incorporated by reference herein in its entirety.

Media content source 502 may also provide media guidance data that can be used to create carousels and queries as described herein. Media guidance data may be provided to the client devices using any suitable approach. Program schedule data and other guidance data may be provided to the client devices on a television channel sideband, using an in-band digital signal, using an out-of-band digital signal, or by any other suitable data transmission technique.

Figure 6:
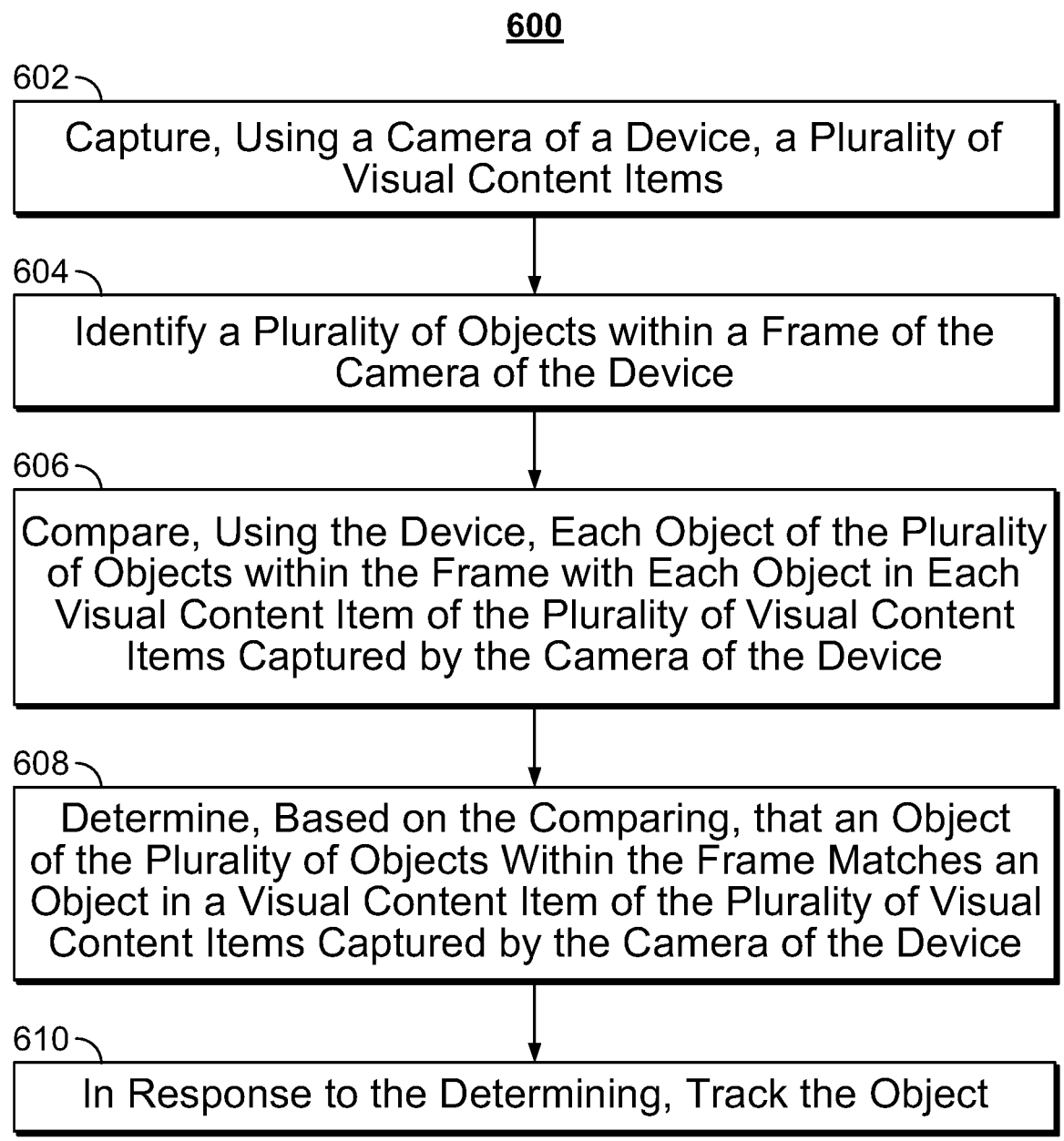
FIG. 6 is a flowchart of an illustrative process for identifying an object to track, in accordance with some embodiments of the disclosure.

The systems and devices described in FIGS. 4 and 5 enable not only display of the screens of FIGS. 1-3, but also the execution of processes described in FIGS. 6-10. FIG. 6 is an illustrative process for creating a screen (e.g., a query results display). Process 600 of FIG. 6 exemplifies actions that may be taken to determine which object to track. At 602, control circuitry 404 captures, using a camera of a device, a plurality of visual content items. For example, a handheld device (e.g., a smart phone or an electronic tablet) may be equipped with a camera that captures visual content (e.g., photos, videos, or other suitable content). Over time, a large number of visual content items can be captured by the handheld device and stored in its storage (e.g., storage 408).

At 604, control circuitry 404 identifies a plurality of objects within a frame of the camera of the device. As described above, various ways can be used to identify objects within the camera's frame of objects within an image received from a remote camera. Those include machine learning techniques, edge detection and image comparison techniques, and other suitable techniques. The control circuitry may receive a frame captured from a camera integrated into the device (e.g., camera 416). The captured frame may be in a form of an image file. The image file may be transferred from the camera in a raw format or can be compressed, if needed.

At 606, control circuitry 404, compares, using the device, each object of the plurality of objects within the frame with each object in each visual content item of the plurality of visual content items captured by the camera of the device. For example, the control circuitry may iterate over each visual content item that was captured by the device. For each visual content item, the control circuitry may retrieve the item, from storage of the device. In some embodiments, the captured content items may be stored at a remote location (e.g., in a data store associated with a user or the device). The control circuitry may transmit a command (e.g., via I/O path 402) to the remote server to retrieve each item. The control circuitry may scan through each frame of the content item to identify one or more objects within the first visual content item. An identifier for each identified object may be stored for comparison. In some embodiments, the comparison may be performed on the fly. For example, as the control circuitry identifies the objects within visual content items, it may compare the objects with each object identified within the frame of the camera.

At 608, control circuitry 404, determines, based on the comparing, that an object of the plurality of objects within the frame matches an object in a visual content item of the plurality of visual content items captured by the camera of the device. For example, if the control circuitry finds a match, a flag is set that a match has been found. In some embodiments, the control circuitry may generate a data structure that stores an identifier of the matching object. The identifier may be a set of coordinates on the image that delineates the object. The identifier may also be a link to a data structure that stores the locations of the coordinates.

At 610, control circuitry 404, in response to the determining, tracks the object. For example, as shown in FIG. 1, the control circuitry may perform a zoom-in operation on the object that was matched. In some embodiments the control circuitry may perform the zoom-in operation on the image being received from the camera (i.e., a software zoom). Specifically, the control circuitry may continue receiving frames in the form of images. As the images are received the control circuitry may use one of many available algorithms to perform a zoom-in operation on the image. The control circuitry may use weighted median zoom to perform the zoom-in operation. In some embodiments, the control circuitry may perform the zoom-in operation using the embedded camera. Specifically, the control circuitry may transmit a command to the integrated camera to perform an optical zoom operation and start receiving images with the matched object zoom-in. The control circuitry together with the command to perform the zoom-in may transmit to the camera the proper optical information needed for the zoom.

Figure 8:
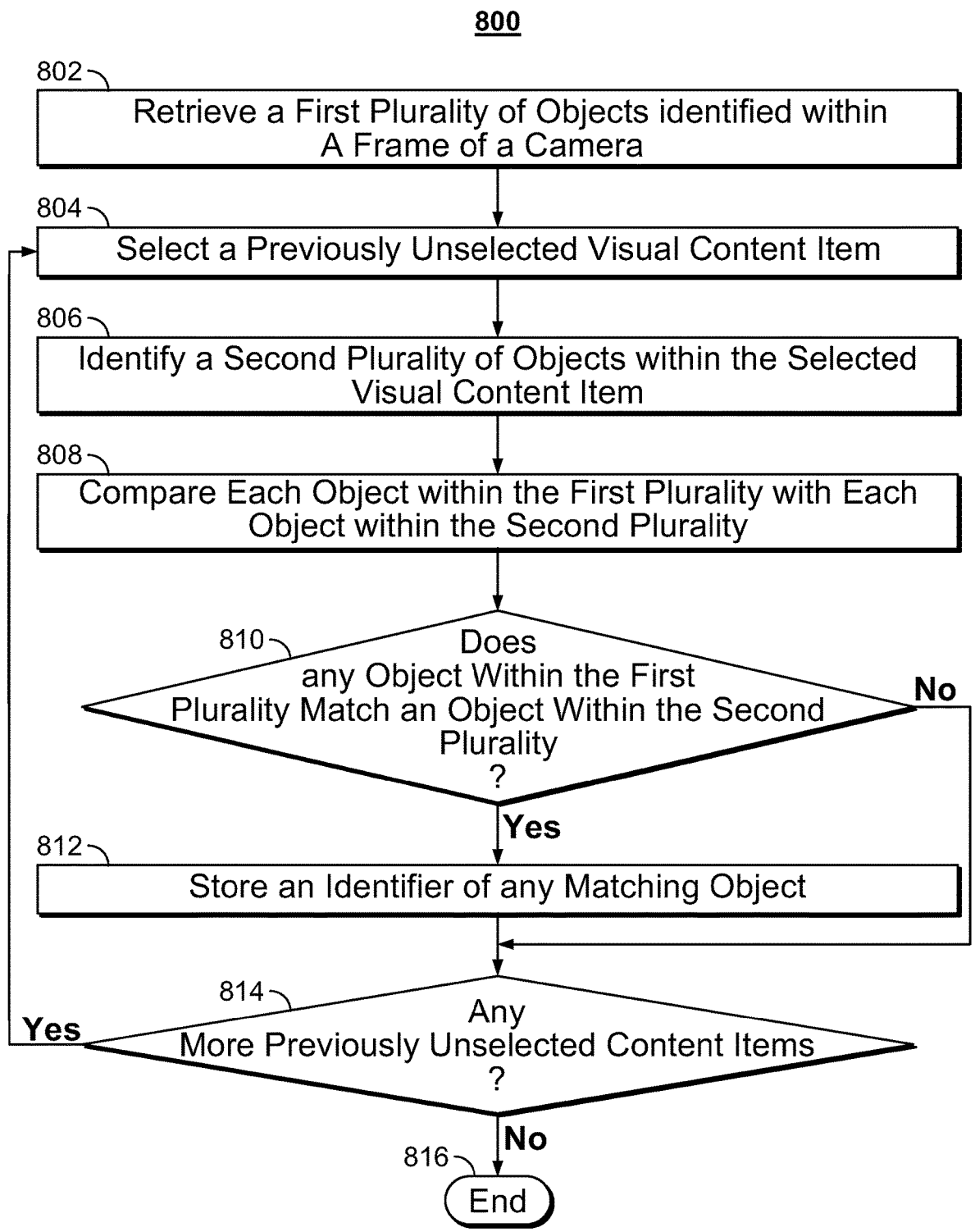
FIG. 8 is a flowchart of an illustrative process for matching objects within a frame of a camera or within an image with objects in visual content items captured by a device, in accordance with some embodiments of the disclosure.

FIG. 8 is a flowchart of an illustrative process for matching objects within a frame of a camera or within an image with objects in visual content items captured by a device. At 802, control circuitry 404 retrieves a first plurality of objects identified within a frame of a camera. The control circuitry may have identified the objects within the frame of the camera and stored those objects for a later comparison (e.g., in storage 408). The control circuitry may retrieve those objects (e.g., from storage 408).

The control circuitry may iterate through each visual content item captured by the camera of the device. At 804, control circuitry 404 selects a previously unselected visual content item. A list of visual content items may be stored (e.g., storage 408) as a data structure that the control circuitry can iterate through (e.g., array). The control circuitry may select the first entry in the data structure that has not been selected yet. At 806, control circuitry 404 identifies a second plurality of objects within the selected visual content item. If the visual content item is an image (e.g., a photograph), the control circuitry may apply edge detection algorithms and/or machine learning algorithms (as described above) to the image to identify the object. If the visual content item is a video, the control circuitry may analyze each frame of the video to identify different objects within the visual content item.

At 808, control circuitry 404 compares each object within the first plurality with each object within the second plurality. For example, the control circuitry may iterate through each object within the first plurality and compare each object with each object of the second plurality. At 810, control circuitry 404 determines whether any object within the first plurality matches an object within the second plurality. If the control circuitry determines that an object within the first plurality matches an object within the second plurality, process 800 moves to 812. At 812, control circuitry 404 stores an identifier of any matching object. If no object within the first plurality matches an object within the second plurality, process 800 moves to 814. It should be noted that after action 812 process 800 moves to action 814.

At 814, control circuitry 404 determines whether there are more previously unselected content items. For example, the control circuitry may access the data structure that stores visual content items and determine whether the full data structure has been iterated through. If there are no more previously unselected items, process 800 moves to 816 and ends. However, if there are more previously unselected items process 800 moves to 804, where the next previously unselected visual content item is selected, and the process proceeds with this next selected visual content item. It should be noted that process 800 may be used in conjunction with process 600. Specifically, process 800 may be integrated into actions 606 and/or 608 with some modification. That is, process 800 may be used to compare objects of process 600.

In some embodiments, the control circuitry may determine that multiple objects with a frame of a camera match an object within visual content items captured by the device. Specifically, the control circuitry may determine that two or more objects of the plurality of objects within the frame each match an object in one or more visual content items of the plurality of visual content items. As the control circuitry finds matching objects within the visual content items, the control circuitry may keep track of how many visual content items include objects that have been matched to each object within the frame. Thus, the control circuitry may calculate, for each of the two or more objects of the plurality of objects, a number of visual content items with matching objects, and select an object to track based on the number of visual content items with matching objects.

Figure 9:
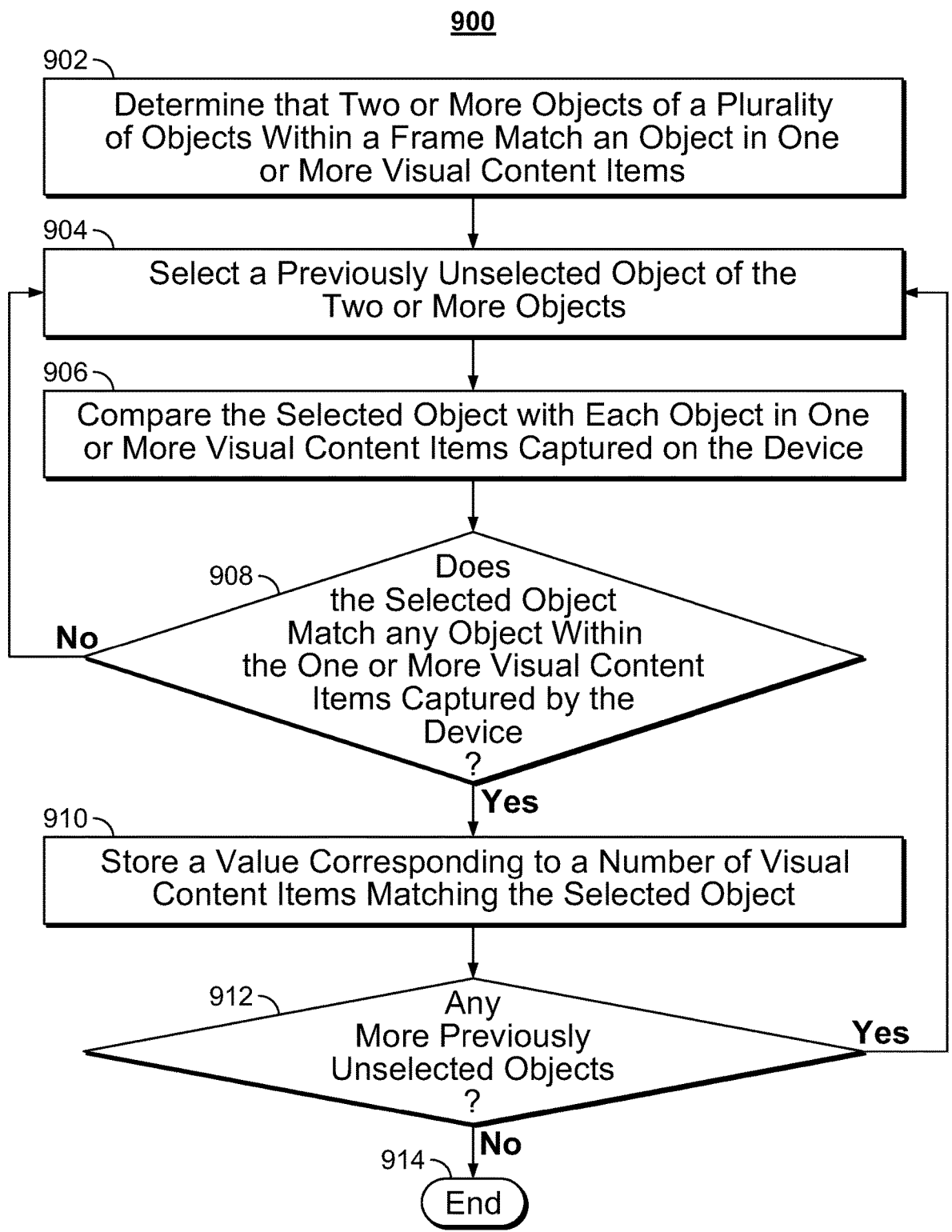
FIG. 9 is a flowchart of an illustrative process for determining a number of visual content items that objects within a frame of a camera appear in, in accordance with some embodiments of the disclosure.

FIG. 9 is a flowchart of an illustrative process for determining a number of visual content items that objects within a frame of a camera appear in. At 902, control circuitry 404 determines that two or more objects of a plurality of objects within a frame match an object in one or more visual content items. It should be noted that this determination may be made using process 800 of FIG. 8. Thus, some or all of the actions of process 800 may be added to process 900. At 904, control circuitry 404 selects a previously unselected object of the two or more objects. For example, the control circuitry may iterate through each object in the frame that has a matching object in one or more visual content items captured on the device. Thus, at every iteration the control circuitry may select a previously unselected object (e.g., from a data structure being stored at storage 408).

At 906, control circuitry 404 compares the selected object with each object in one or more visual content items captured on the device. For example, the control circuitry may compare pixels of the selected object with pixels of each object in one or more visual content items. Alternatively, as described above, a machine learning algorithm can be used to compare the objects. At 908, control circuitry 404 determines whether the selected object matches any object within one or more visual content items captured by the device. If the selected object does not match any object within the one or more visual content items captured by the device process 900 moves to 904, where another previously unselected object of the two or more objects is selected. It should be noted that process 900 is keeping track of all the objects of the two or more objects that have been selected in order to keep selecting previously unselected objects. For example, these objects may be stored in a data structure that can be iterated through (e.g., an array).

If the selected object does match an object within the one or more visual content items captured by the device, process 900 moves to 910. At 910, control circuitry 404 stores a value corresponding to a number of visual content items matching the selected object. The control circuitry may store the value in storage 408 or at a remote server (e.g., server 504). Control circuitry 404 will store a separate value for each matching object so that at a later time an object with most matches is determined. That is, the control circuitry will be able to determine which object appears in the largest number of visual content items. At 912, control circuitry 404 determines whether there are any more previously unselected objects. If there are more previously unselected object process 900 moves to 904, where another previously unselected object is selected. If control circuitry 404 determines that there are no more previously unselected objects, process 900 moves to 914 and ends.

In some embodiments, the tracking application may detect people (specifically faces) in the frame or image and process those different from other objects. The control circuitry may determine that one or more of the plurality of objects within the frame correspond to one or more persons. In response to determining that one or more of the plurality of objects within the frame correspond to one or more persons, generate a set of objects that includes the one or more of the plurality of objects that correspond to the one or more persons.

Figure 10:
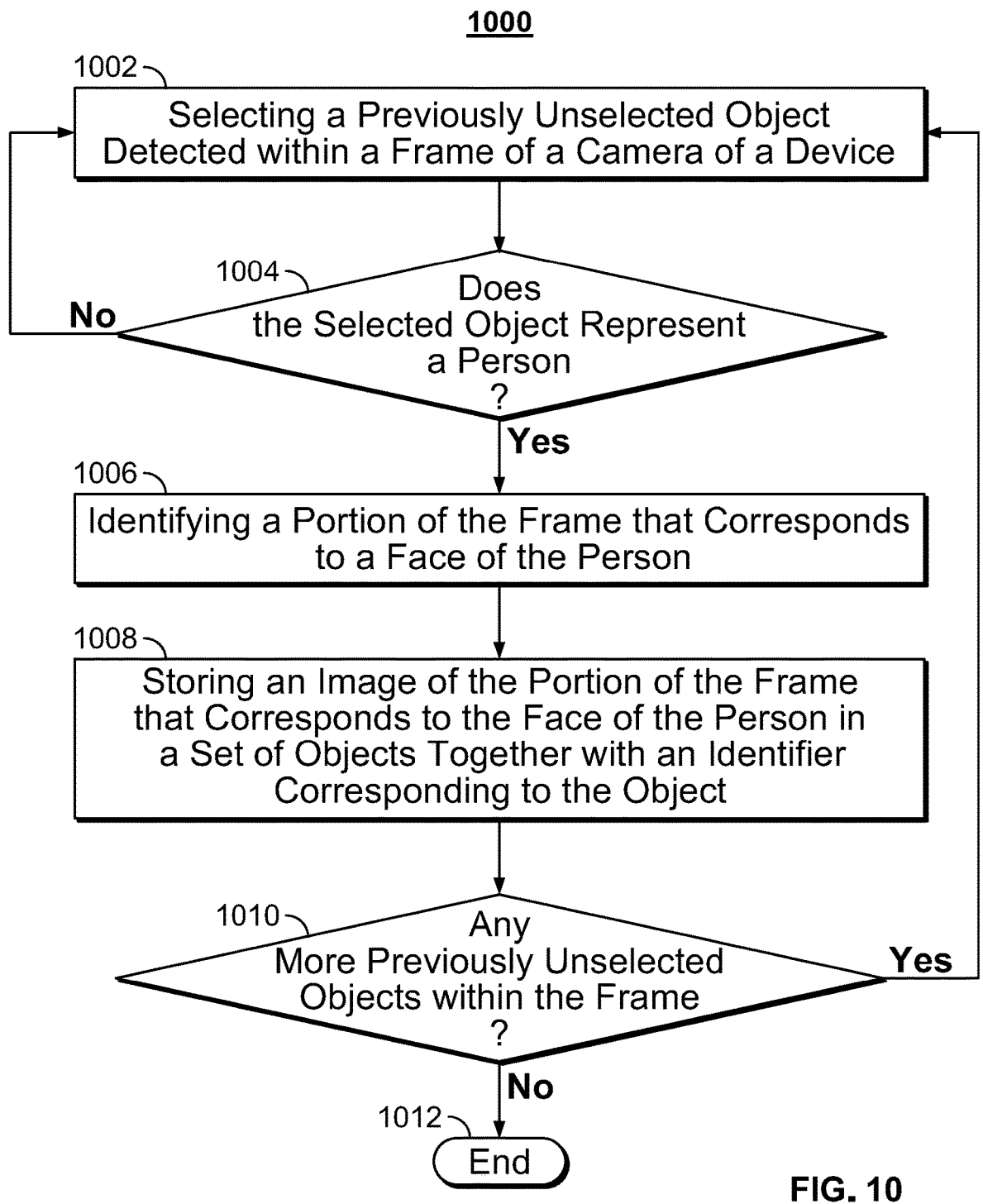
FIG. 10 is a flowchart of an illustrative process for identifying and storing faces of persons identified within a frame of a camera, in accordance with some embodiments of the disclosure.

FIG. 10 is a flowchart of an illustrative process for identifying and storing faces of persons identified within a frame of a camera. At 1002, control circuitry 404 selects a previously unselected object detected within a frame of a camera of a device. For example, the control circuitry may have identified a number of different objects within a frame of a camera and may iterate through each object. At 1004, control circuitry 404 determines whether the selected object represents a person. For example, control circuitry may execute an image analysis algorithm to determine whether the image is of a person. If the object does not represent a person process 1000 moves to 1002, where another previously unselected object is selected for processing. If the control circuitry determines that the object represents a person process 1000 moves to 1006.

At 1006, control circuitry 404 identifies a portion of the frame that corresponds to a face of the person. Some of the available algorithm for identifying faces include rules-based algorithms for finding parts of the face (e.g., nose, eyes, mouth, etc.) and using distance rules to determine whether those identified parts constitute a face. A template matching algorithm can be used to detect faces within images. Some of the current algorithms include machine learning algorithms that utilize neural networks, support vector machines, or other suitable systems for face detection. At 1008, control circuitry 404 stores an image of the portion of the frame that corresponds to the face of the person in a set of objects together with an identifier corresponding to the object. For example, the control circuitry may generate a data structure to storage the set of objects and save that data structure to storage 408. The data structure may include a field for each object and a corresponding field for each identifier associated with each object.

At 1010, control circuitry 404 determines whether there are any more previously unselected objects within the frame. If control circuitry 404 determines that there are more previously unselected objects within the frame, process 1000 moves to 1002, where another previously unselected object detected within the frame of the camera of the device is selected. If control circuitry 404 determines that there are no more previously unselected objects within the frame, process 1000 moves to 1012 and ends.

Thus, FIG. 10 is one example of a process where in response to determining that one or more of the plurality of objects within the frame corresponds to one or more persons, the tracking application identifies one or more portions of the visual content item corresponding to one or more faces of the one or more persons, and storing the one or more faces. The tracking application may compare each object within the set of objects (e.g., as generated by process 1000 of FIG. 10) with each object in each visual content item of the plurality of visual content items prior to comparing other objects within the frame. This type of processing may improve speed in certain situations.

Another way to improve speed in certain situations is to pre-process visual content items. Specifically, the tracking application may retrieve each visual content item of the plurality of visual content items and identify, within each visual content item of the plurality of content items, a corresponding set of objects. Various methods for identifying objects within the frame has been discussed above, and those methods may be used herein to identify a set of objects within each visual content item. The tracking application may generate a unique signature for each unique object in each set of objects, and store each unique signature (e.g., in storage 408 or at server 504).

Figure 11:
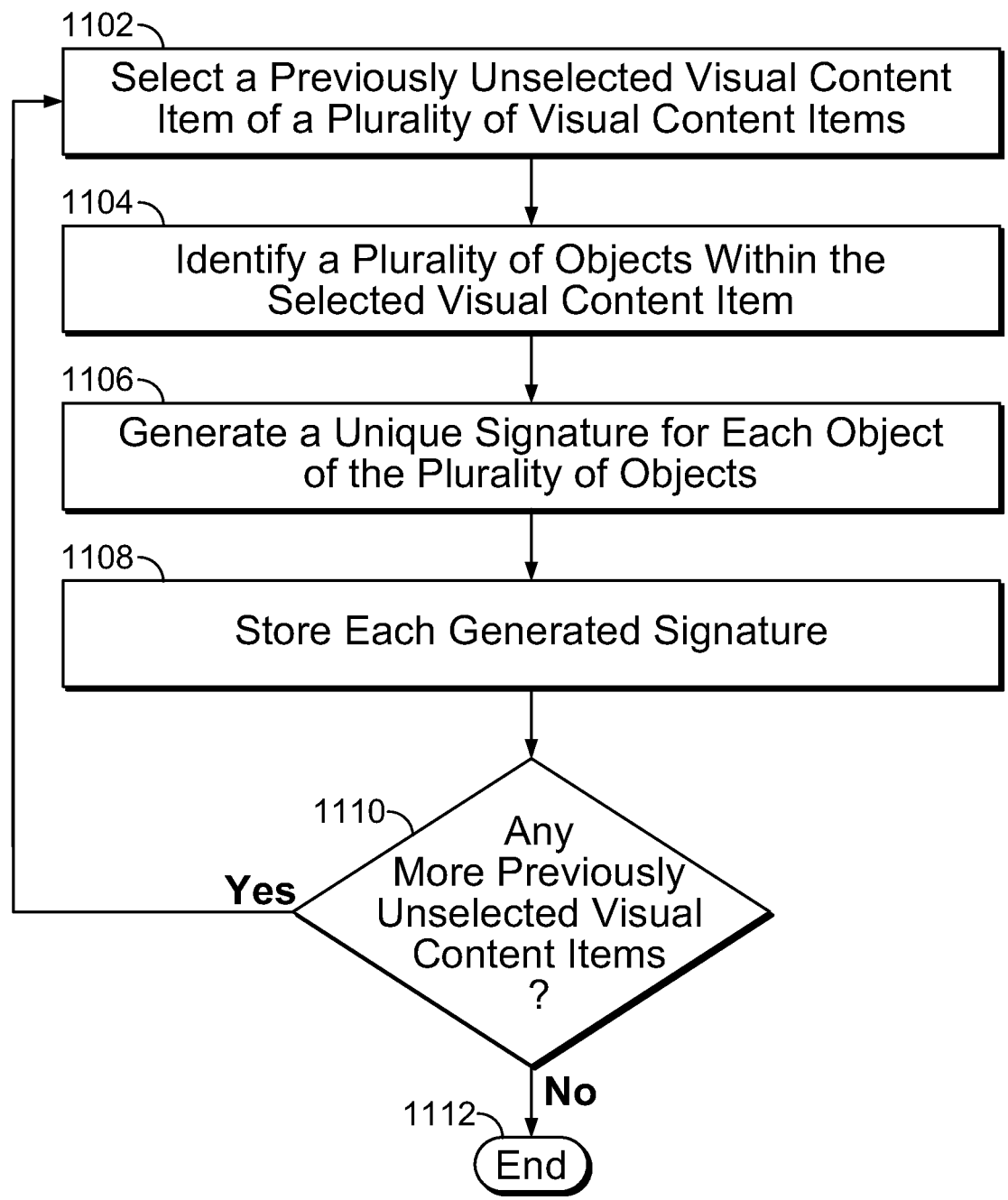
FIG. 11 is a flowchart of an illustrative process for storing signatures associated with objects identified in a frame of a camera, in accordance with some embodiments of the disclosure.

FIG. 11 is a flowchart of an illustrative process for storing signatures associated with objects identified in a frame of a camera. At 1102, control circuitry 404 selects a previously unselected visual content item of a plurality of visual content items. For example, the control circuitry may access an area on the device where visual content items are stored (e.g., an area in storage 408) and start iterating through each visual content item that is found on the storage area of the device. Each item may be selected in turn for processing. At 1004, control circuitry 404 identifies a plurality of objects within the selected visual content item. As described above, the control circuitry may use various machine learning techniques to identify objects within visual content items. The control circuitry upon identifying each object may store an image (e.g., a plurality of pixels representing the object)

At 1106, control circuitry 404 generates a unique signature for each object of the plurality of objects. The control circuitry may use one or more algorithms to generate each signature. For example, color histograms, texture properties, relative brightness of portions of objects, and other suitable attributes may be used alone or in combination to generate a signature. At 1108, control circuitry 404 stores each signature (e.g., in storage 408 or at a remote server such as server 504. For example, the control circuitry may generate a data structure that will store each generated signature together with an identifier of the object.

At 1110, control circuitry 404 determines whether there are any more previously unselected visual content items. If the control circuitry determines that there are more previously unselected visual content items process 1100 moves to 1102, where another previously unselected visual content item of the plurality of visual content items is selected for processing. If the control circuitry determines there are no more previously unselected visual content items process 1100 moves to 1112 and ends.

In some embodiments, the control circuitry, whether while iterating through each visual content item of the plurality of visual content items to generate the unique signatures or by a different process, may determine, for each unique object, a number of visual content items that each unique object appears in. Thus, when comparing each object of the plurality of objects within the frame with each object in each visual content item captured by the device, the control circuitry may compare generated signatures. Additionally, the control circuitry may store for each unique object a corresponding number of visual content items that each unique object appears in.

Figure 12:
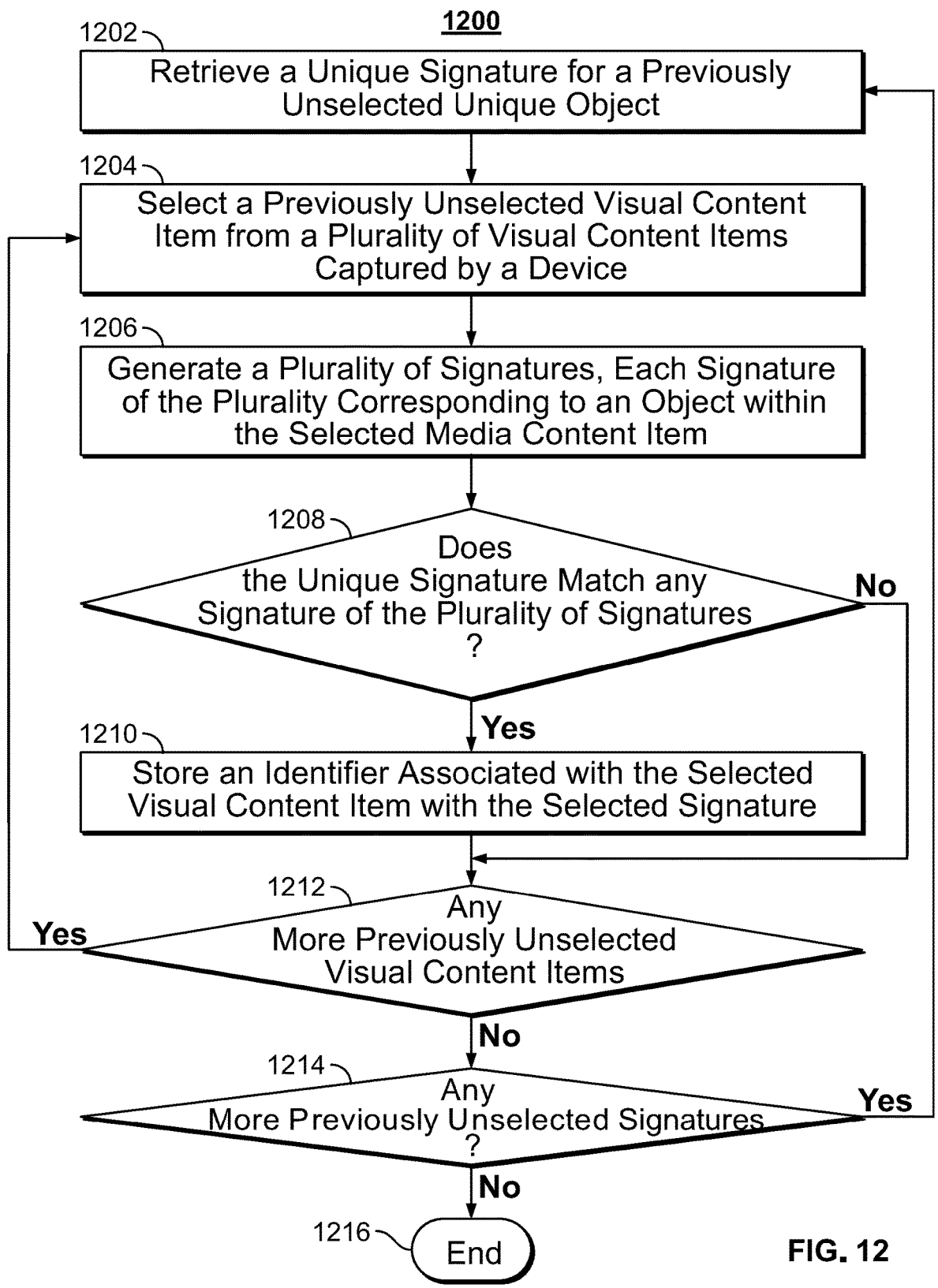
FIG. 12 is a flowchart of an illustrative process for storing signatures of objects detected in a frame of a camera of a device together with identifiers of visual content items that the objects appear in, in accordance with some embodiments of the disclosure.

It may be useful to store, together with the signature and the identifier of the corresponding object, an identifier of each visual content item that the object appears in. FIG. 12 is a flowchart of an illustrative process for storing signatures of objects detected in a frame of a camera of a device together with identifiers of visual content items that the objects appear in. At 1202, control circuitry 404 retrieves a unique signature for a previously unselected unique object. For example, the control circuitry may iterate through each unique signature and select a first one from a data structure (e.g., an array) stored in storage (e.g., storage 408).

At 1204, control circuitry 404 selects a previously unselected visual content item from a plurality of visual content items captured by the device. The control circuitry may iterate through each visual content item, thereby creating a dual loop together with a loop in action 1202. At 1206, control circuitry 404 generates a plurality of signatures, each signature of the plurality corresponding to an object within the selected media content item. Signature generation has been discussed in relation to FIG. 11 the same methods to generate signatures may be used in process 1200.

At 1208, control circuitry 404 determines whether the unique signature matches any signature of the plurality of signatures. For example, the control circuitry may compare the signature and determine whether they match. Each signature may be a digital file describing characteristics of the corresponding object. Thus, like characteristics within the digital file may be compared with like characteristics in the digital file generated for each of the plurality of signatures. If the unique signature does not match any signature of the plurality of signatures process 1200 moves to 1212. If the unique signature matches a signature of the plurality of signatures, process 1200 moves to 1210.

At 1210, control circuitry 404 stores an identifier associated with the selected visual content item with the selected signature. For example, the control circuitry may store a link to the corresponding visual content item with the signature. At 1212, control circuitry 404 determines whether there are any more previously unselected visual content items. If there are more previously unselected visual content items, process 1200 moves to 1204, where another previously unselected visual content item from the plurality of visual content items captured by the device is selected by the control circuitry. As the control circuitry iterates through each visual content item, an identifier of each content item that the object corresponding to the signature appears in is stored together with the signature.

If control circuitry 404 determines that there are no more previously unselected visual content items process 1200 moves to 1214. At 1214, control circuitry 404 determines whether there are any more previously unselected objects. If there are more previously unselected objects process 1200 moves to 1202, where another previously unselected signature is selected for processing. If the control circuitry determines that there are no more previously unselected signatures, process 1200 moves to 1216 and ends.

It may be useful to associating an object with a keyword and track that object if within a frame. Specifically, the control circuitry may associate an object within a visual content item of the plurality of visual content items with a keyword. The control circuitry may receive a command to track the object, where the command contains the keyword. For example, the control circuitry may receive a command: "Track Jack," where Jack is a person identified in the frame of the camera. The control circuitry may determine that two or more objects of the plurality of objects within the frame each match an object in one or more visual content items of the plurality of visual content items. For example, there may be several people in the frame of the camera. The control circuitry may compare the keyword with each keyword corresponding to each of the two or more objects, and determine, based on the comparing, track the matching object.

Figure 7:
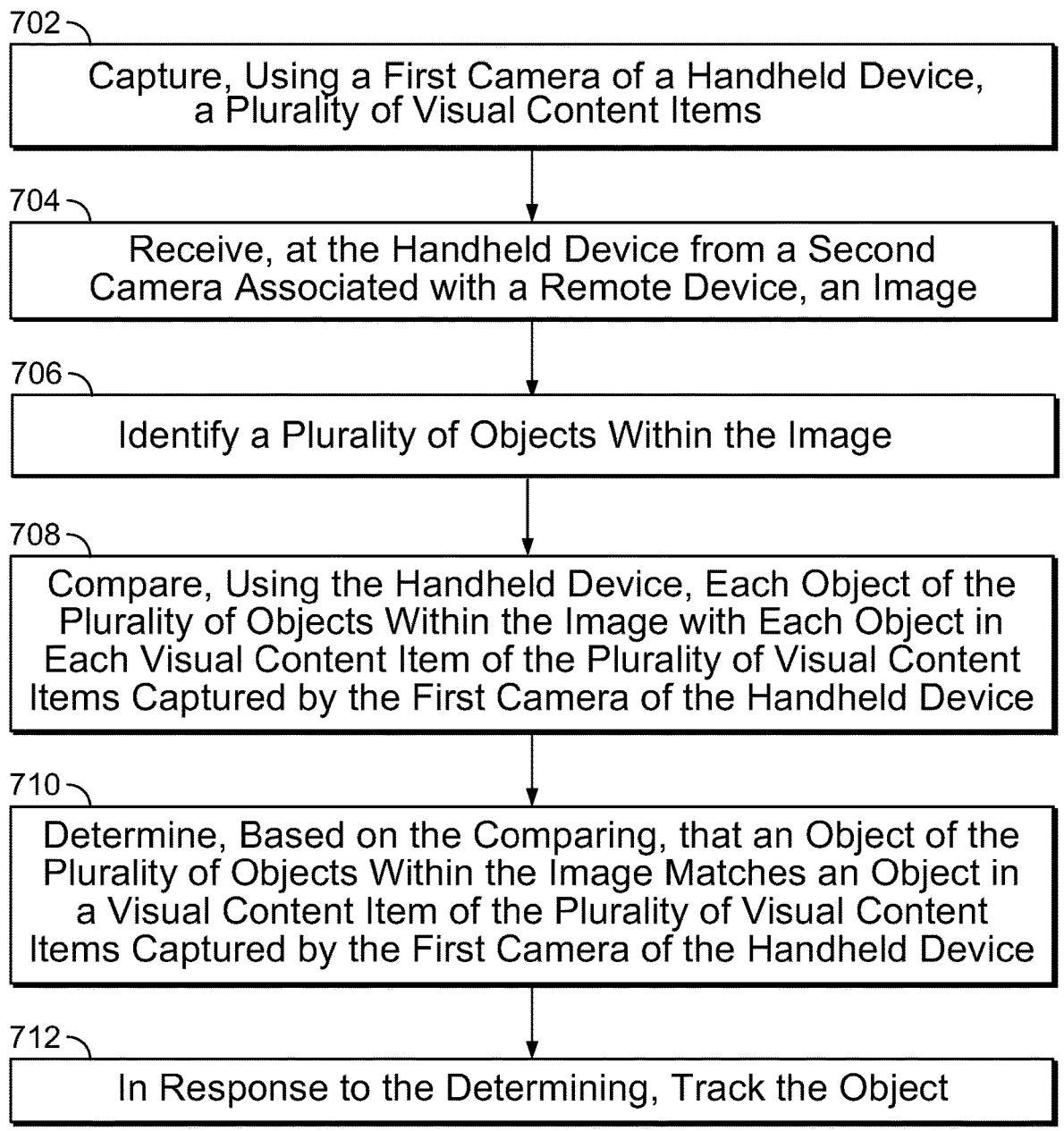
FIG. 7 is a flowchart of another illustrative process for identifying an object to track, in accordance with some embodiments of the disclosure.

In some embodiments, the methods and systems described herein may be used with a camera remote to a device. FIG. 7 is a flowchart of another illustrative process for identifying an object to track, using a remote camera. FIG. 2 and FIG. 3 illustrates possible settings for use of the described systems and methods. Specifically, FIG. 2 illustrates a setting with a single remote camera, while FIG. 3 illustrates a possible setting with two remote cameras. It should be noted that these methods and systems may be used with a greater number of cameras.

At 702, control circuitry 404 captures using a first camera of a handheld device a plurality of visual content items. Action 702 may be performed in a similar manner to action 602. At 704, control circuitry 404 receives, at the handheld device from a second camera associated with a remote device, an image. For example, camera 206 may be communicating with the handheld device directly. Alternatively or additionally, camera 206 may be connected to server 504 and the handheld device may be receiving images from server 504.

At 706, control circuitry 404 identifies a plurality of objects within the image. For example, the control circuitry may use any method to identify the object that was described with respect to action 604 of FIG. 6. Except, instead of receiving an image from a frame of a built-in camera that image in this case is received from a remote camera. At 708, control circuitry 404 compares, using the handheld device, each object of the plurality of objects within the image with each object in each visual content item of the plurality of visual content items captured by the first camera of the handheld device. For example, this comparison can be performed in the same manner as described with respect to action 606 of FIG. 6.

At 710, control circuitry 404 determines, based on the comparing, that an object of the plurality of objects within the images matches an object in a visual content item of the plurality of visual content items captured by the first camera of the handheld device. For example, this comparison may be performed in a manner similar to the comparison described in action 608 of FIG. 6. At 712, control circuitry 404, in response to the determining, tracks the object. For example, tracking the object may involve receiving a video feed from the second camera. The control circuitry may continuously identify the object within each image of the video feed and perform a zoom-in operation on the object within each image of the video feed. It should be noted that the object may be changing locations with the image, but the control circuitry may perform the zoom operation on that specific object in spite of the movement. In some embodiments, the control circuitry may determine, from a subsequent image received from the second camera, that the object is no longer in the image, and in response, transmit a command to the camera to perform a zoom-out operation. This way the object may be reacquired, and the zoom-in operations may continue on the object. It should be noted that if the control circuitry is unable to reacquire the object by controlling one camera (e.g., camera 306), the control circuitry may attempt to acquire the object from another camera (e.g., camera 308).

Figure 13:
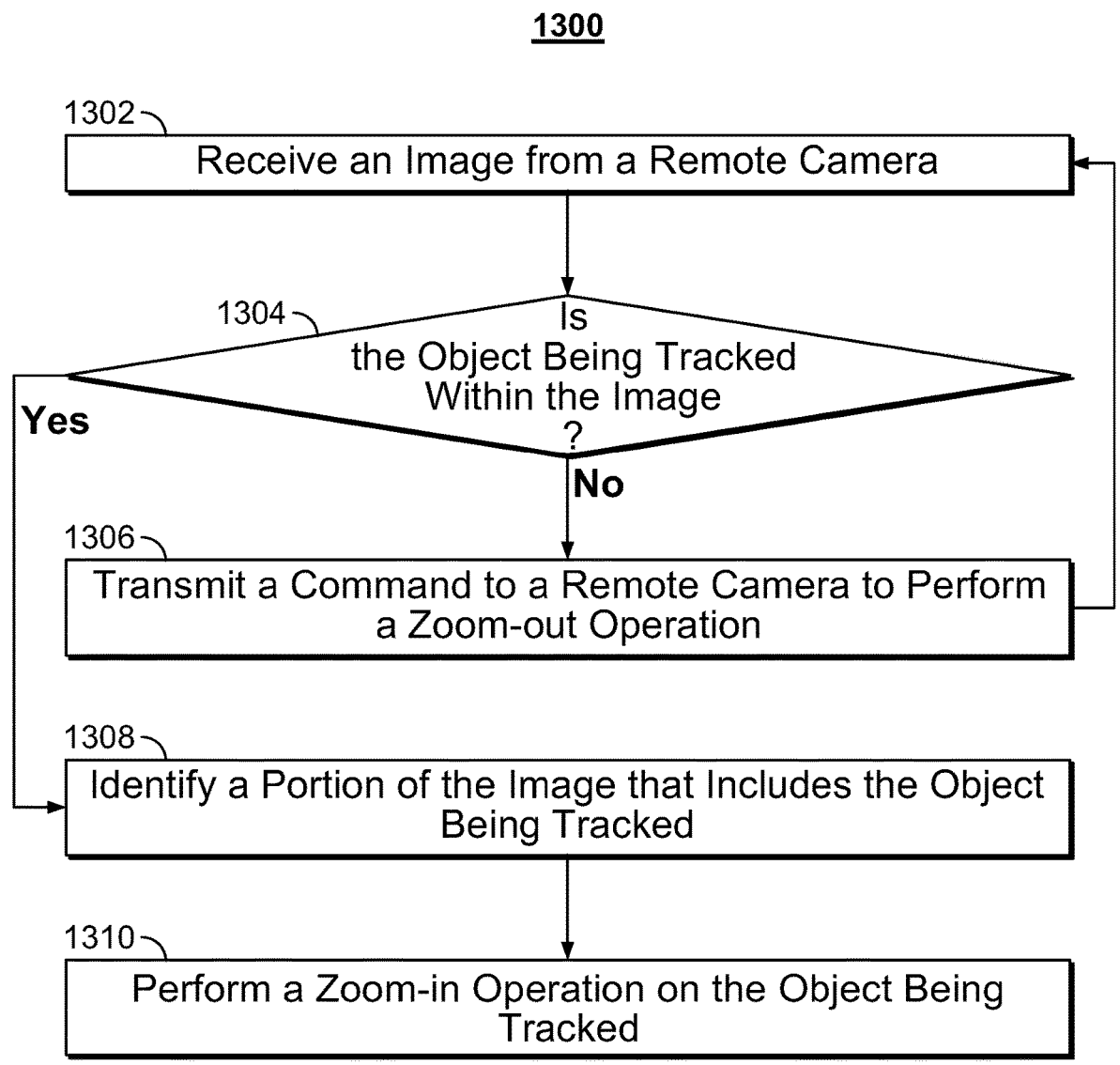
FIG. 13 is a flowchart of an illustrative process for transmitting a command to a remote camera to track an identified object, in accordance with some embodiments of the disclosure.

FIG. 13 is a flowchart of an illustrative process for transmitting a command to a remote camera to track an identified object. At 1302, control circuitry 404 receives an image from a remote camera. For example, the control circuitry may receive the image directly from camera 206 or one or both of 306 and 308. At 1304, control circuitry 404 determines whether the object being tracked is within the image. If the object that is being tracked is within the image, process 1300 moves to 1308, where control circuitry 404 identifies a portion of the image that includes the object that is being tracked. The control circuitry may perform the identification using machine learning algorithms described in relation to FIG. 6 in a fashion similar to identifying objects within a frame of a camera. At 1310, control circuitry 404 performs a zoom-in operation on the object being tracked. For example, the control circuitry may perform a software zoom-in operation where pixels of the original image are interpolated to create a zoomed-in image. In some embodiments, the control circuitry may transmit a command to the camera (e.g., camera 206, 306, or 308) a command to perform an optical zoom-in operation discussed above.

If at 1304, control circuitry 404 determines that the object being tracked is not within the image, process 1300 moves to 1306, where the control circuitry transmit a command to the remote camera to perform a zoom-out operation. For example, this command may be formatted correctly for the right camera. In some embodiments, the command can go to multiple cameras and images from multiple cameras may be process by the control circuitry to reacquire the object. As the zoom-out operation is completed, process 1300 goes to 1302, where the next image is analyzed for presence of the object.

If the control circuitry determines that multiple objects in an image received from a remote camera match an object within the visual content items captured by the handheld device, control circuitry 404 may select the object that appears in the largest number of visual content items. Thus, the actions of FIG. 9 equally apply to this embodiment as to the embodiments described above. It should be noted that FIG. 8 also applies to this embodiment, where objects identified within the image received from a remote camera are compared with objects identified within the visual content items captured by the handheld device.

FIGS. 10-12 also apply to this embodiment. Specifically, objects representing persons may be processed differently (as described in FIG. 10) from objects representing non-persons. The signatures of FIG. 11 may also be used in this embodiment. This embodiment would be different in that the signatures are created from objects extracted from images received from a remote camera instead of objects within the frame. Also, FIG. 12 actions may be applied in this embodiment where the comparison between signatures is performed.

Figure 14:
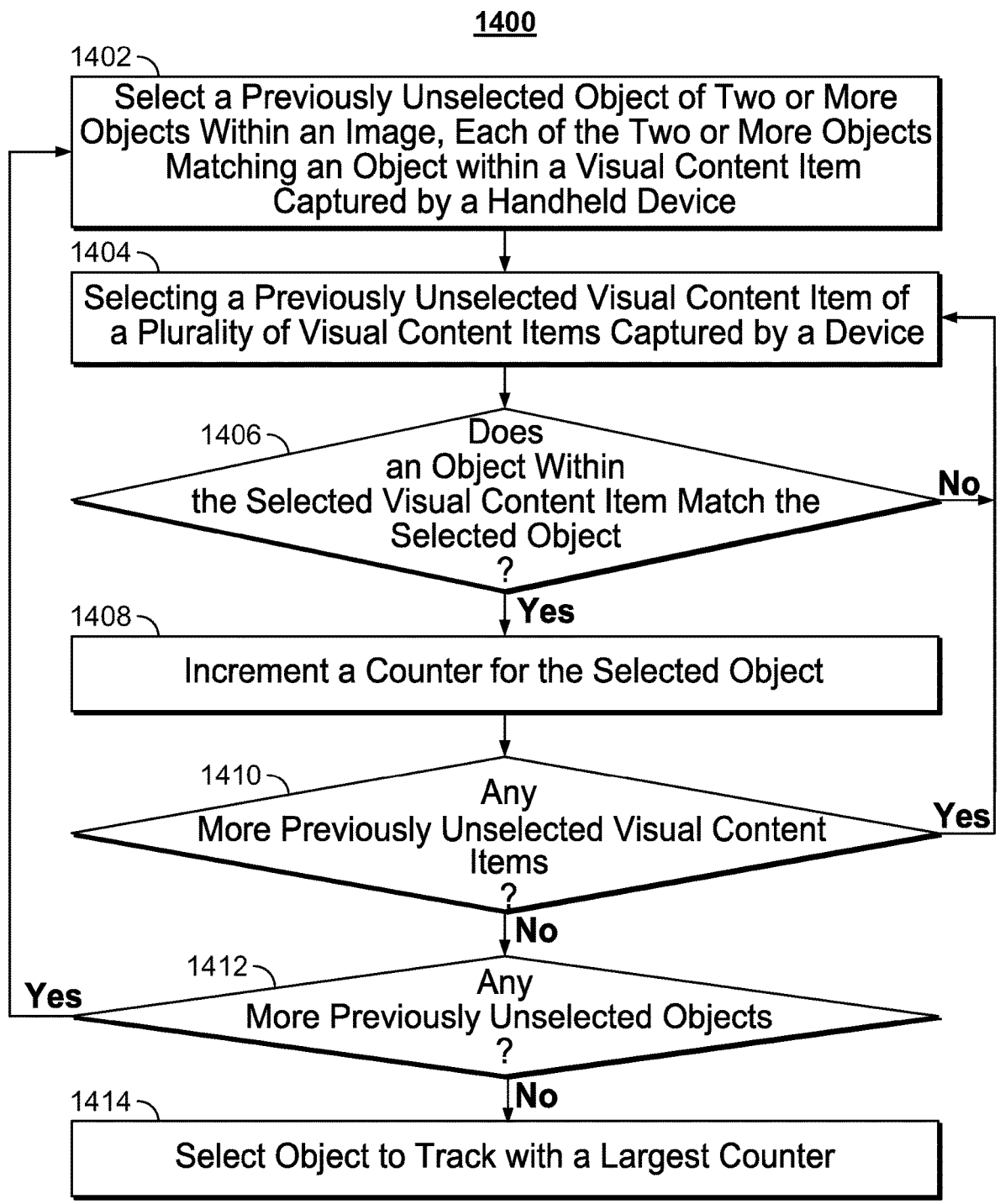
FIG. 14 is a flowchart of an illustrative process for selecting an object to track based on a number of visual content items captured by the device, in accordance with some embodiments of the disclosure.

FIG. 14 is a flowchart of an illustrative process for selecting an object to track based on a number of visual content items captured by the device. It should be noted that FIG. 14 is applicable to embodiments that detect objects within the frame of the camera of the device and is also applicable to embodiments that detect objects within an image received from a remote camera. At 1402, control circuitry 404 selects a previously unselected object of two or more objects within an image, each of the two or more objects matching an object within a visual content item captured by a handheld device. For example, the control circuitry may iterate over each object detected within the image. At 1404, control circuitry 404 selects a previously unselected visual content item of a plurality of visual content items captured by a device (e.g., a handheld device).

At 1406, control circuitry 404 determines whether an object within the selected visual content item matches the selected object. If the object within the selected visual content item does not match the selected object, process 1400 moves to 1404, where another previously unselected visual content item is selected. If the object within the selected visual content item matches the selected object, process 1400 moves to 1408, where control circuitry 404 increments a counter for the selected object. For example, each object of the two or more objects detected with the image from the remote camera may have a corresponding counter that may be incremented in turn.

At 1410, control circuitry 404 determines whether there are any more previously unselected visual content items. If there are more previously unselected visual content items process 1400 moves to action 1404, where another previously unselected visual content item is selected. If there are no more previously unselected visual content items, process 1400 moves to 1412. At 1412, control circuitry 404 determines whether there are any more previously unselected objects. If there are more previously unselected objects process 1400 moves to 1402, where another previously unselected object is selected for processing. If there are no more previously unselected object process 1400 moves to 1414. At 1414, control circuitry 404 selects an object to track with the largest counter. For example, the control circuitry may compare each counter and select the largest one.

It will be apparent to those of ordinary skill in the art that methods involved in the present invention may be embodied in a computer program product that includes a computer-usable and/or readable medium. For example, such a computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

The processes discussed above are intended to be illustrative and not limiting. One skilled in the art would appreciate that the steps of the processes discussed herein may be omitted, modified, combined, and/or rearranged, and any additional steps may be performed without departing from the scope of the disclosure. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

While some portions of this disclosure may make reference to "convention," any such reference is merely for the purpose of providing context to the invention(s) of the instant disclosure, and does not form any admission as to what constitutes the state of the art.

What is claimed is:

1. A method for identifying an object to track, the method comprising:
   capturing, using a first camera of a handheld device, a plurality of visual content items;
   storing the plurality of visual content items on the handheld device;
   receiving, at the handheld device from a second camera on a remote device remote from the handheld device, a live video feed captured by the second camera;
   identifying a plurality of objects within a frame of the live video feed captured by the second camera;
   comparing, using the handheld device, each object of the plurality of objects within the frame of the live video feed captured by the second camera on the remote device with each object of the plurality of stored visual content items captured by the first camera of the handheld device;
   determining, based on the comparing, that an object of the plurality of objects within the frame of the live video feed captured by the second camera on the remote device matches an object in at least one of the plurality of stored visual content items captured by the first camera of the handheld device, wherein the matched object is the object to track; and
   in response to the determining, tracking the object to track, wherein the tracking comprises:
      based on detecting, by the handheld device, that the object to track within the live video feed has moved outside of the frame of the live video feed, causing a zoom-out operation to be performed on the frame of the live video feed to capture the object to track while the object to track is moving; and
      based on determining that the zoom-out operation on the frame has recaptured the object to track within the frame of the live video feed while the object to track is moving, causing a zoom-in operation to be performed on the frame of the live video feed with a focus on the object to track while the object to track is moving.

2. The method of claim 1, further comprising:
   determining, from a subsequent frame of the live video feed received from the second camera, that the object to track is no longer in the subsequent frame; and
   in response to determining that the object to track is no longer in the subsequent frame, transmitting a command to the second camera to perform a zoom-out operation.

3. The method of claim 1, wherein comparing each object of the plurality of objects within the frame of the live video feed captured by the second camera with each object in each of the plurality of stored visual content items captured by the first camera of the handheld device comprises:
   retrieving, from storage of the handheld device, a first stored visual content item of the plurality of stored visual content items;
   identifying one or more objects within the first stored visual content item; and
   comparing the one or more objects within the first stored visual content item with each object of the plurality of objects within the frame of the live video feed captured by the second camera.

4. The method of claim 1, further comprising:
   determining that two or more objects of the plurality of objects within the frame of the live video feed each match an object in one or more stored visual content items of the plurality of stored visual content items;
   calculating, for each of the two or more objects of the plurality of objects, a number of stored visual content items with matching objects; and
   selecting the object to track based on the number of stored visual content items with matching objects.

5. The method of claim 1, further comprising:
in response to determining that the one or more of the plurality of objects within the frame of the live video feed corresponds to one or more persons:
identifying one or more portions of the stored visual content item corresponding to one or more faces of the one or more persons; and
storing the one or more faces.

6. The method of claim 1, further comprising:
retrieving each stored visual content item of the plurality of stored visual content items;
identifying, within each stored visual content item of the plurality of stored visual content items, a corresponding set of objects;
generating a unique signature for each unique object in each set of objects; and storing each unique signature.

7. The method of claim 6, further comprising:
determining, for each unique object, a number of stored visual content items that each unique object appears in; and
storing for each unique object a corresponding number of stored visual content items that each unique object appears in.

8. The method of claim 6, wherein comparing, using the handheld device, each object of the plurality of objects within the frame of the live video feed captured by the second camera with each object in each of the plurality of stored visual content items captured by the first camera of the handheld device comprises:
generating, for each object within the frame of the live video feed, a corresponding signature; and
comparing each corresponding signature with a signature of each unique object.

9. The method of claim 1, further comprising:
associating an object within one of the plurality of stored visual content items with a keyword;
receiving a command to track the object, wherein the command contains the keyword;
determining that two or more objects of the plurality of objects within the frame of the live video feed each match an object in one or more of the plurality of stored visual content items;
comparing the keyword with each keyword corresponding to each of the two or more objects; and
determining, based on comparing the keyword with each keyword corresponding to each of the two or more objects, the object to track.

10. The method of claim 1, further comprising:
based on determining that the moving object to track has moved out of a subsequent frame of the live video feed, performing a zoom-out operation until the moving object to track is within the subsequent frame; and
based on determining that the moving object to track has moved within the subsequent frame, performing the zoom-in operation for the live video feed with a focus on the moving object to track.

11. The method of claim 1, wherein the causing the zoom-out operation to be performed on the frame of the live video feed to capture the object to track while the object to track is moving further comprises causing a rotation of the live video feed.

12. A system for identifying an object to track, the system comprising:
a first camera;
a second camera; and
control circuitry configured to:
capture, using the first camera of a handheld device, a plurality of visual content items;
receive, at the handheld device from the second camera on a remote device remote from the handheld device, a live video feed captured by the second camera;
store, on the handheld device, the plurality of visual content items;
identify a plurality of objects within a frame of the live video feed captured by the second camera;
compare, using the handheld device, each object of the plurality of objects within the frame of the live video feed captured by the second camera on the remote device with each object of the plurality of stored visual content items captured by the first camera of the handheld device;
determine, based on the comparing, that an object of the plurality of objects within the frame of the live video feed captured by the second camera on the remote device matches an object in at least one of the plurality of stored visual content items captured by the first camera of the handheld device, wherein the matched object is the object to track; and
in response to the determining, track the object to track, wherein the control circuitry configured to track the object to track is further configured to:
based on detecting, by the handheld device, that the object to track within the live video feed has moved outside of the frame of the live video feed, cause a zoom-out operation to be performed on the frame of the live video feed to capture the object to track while the object to track is moving; and
based on determining that the zoom-out operation on the frame has recaptured the object to track within the frame of the live video feed while the object to track is moving, cause a zoom-in operation to be performed on the frame of the live video feed with a focus on the object to track while the object to track is moving.

13. The system of claim 12, wherein the control circuitry is further configured to:
determine, from a subsequent frame of the live video feed received from the second camera, that the object is no longer in the subsequent frame; and
in response to determining that the object to track is no longer in the subsequent frame, transmit a command to the second camera to perform a zoom-out operation.

14. The system of claim 12, wherein the control circuitry is further configured to compare each object of the plurality of objects within the frame of the live video feed captured by the second camera with each object of the plurality of stored visual content items captured by the first camera of the handheld device by:
retrieving, from storage of the handheld device, a first stored visual content item of the plurality of visual content items;
identifying one or more objects within the first stored visual content item; and
comparing the one or more objects with each object of the plurality of objects within the frame of the live video feed captured by the second camera.

15. The system of claim 12, wherein the control circuitry is further configured to:
determine that two or more objects of the plurality of objects within the frame of the live video feed each match an object in one or more stored visual content items of the plurality of stored visual content items;

calculate, for each of the two or more objects of the plurality of objects, a number of stored visual content items with matching objects; and select the object to track based on the number of stored visual content items with matching objects.

16. The system of claim 12, wherein the control circuitry is further configured to:

in response to determining that the one or more of the plurality of objects within the frame of the live video feed corresponds to one or more persons:

identify one or more portions of the stored visual content item corresponding to one or more faces of the one or more persons; and store the one or more faces.

17. The system of claim 12, wherein the control circuitry is further configured to:

retrieve each stored visual content item of the plurality of stored visual content items;

identify, within each stored visual content item of the plurality of stored visual content items, a corresponding set of objects;

generate a unique signature for each unique object in each set of objects; and store each unique signature.

18. The system of claim 17, wherein the control circuitry is further configured to:

determine, for each unique object, a number of stored visual content items that each unique object appears in; and store for each unique object a corresponding number of stored visual content items that each unique object appears in.

19. The system of claim 17, wherein the control circuitry is further configured to compare, using the handheld device, each object of the plurality of objects within the frame of the live video feed captured by the second camera with each object in each of the plurality of stored visual content items captured by the first camera of the handheld device by:

generating, for each object within the frame of the live video feed, a corresponding signature; and comparing each corresponding signature with a signature of each unique object.

20. The system of claim 12, wherein the control circuitry is further configured to:

associate an object within a visual content item of the plurality of visual content items with a keyword;

receive a command to track the object, wherein the command contains the keyword;

determine that two or more objects of the plurality of objects within the frame of the live video feed each match an object in one or more of the plurality of stored visual content items;

compare the keyword with each keyword corresponding to each of the two or more objects; and determine, based on comparing the keyword with each keyword corresponding to each of the two or more objects, the object to track.

\* \* \* \* \*